United States Patent
Hasegawa et al.

(10) Patent No.: US 9,811,877 B2
(45) Date of Patent: Nov. 7, 2017

(54) IMAGE PROCESSING DEVICE SELECTING ARRANGEMENT METHOD FOR GENERATING ARRANGED IMAGE DATA

(71) Applicant: BROTHER KOGYO KABUSHIKI KAISHA, Nagoya, Aichi (JP)

(72) Inventors: Tomohiko Hasegawa, Okazaki (JP); Ryohei Ozawa, Nagoya (JP); Takuya Shimahashi, Nagoya (JP)

(73) Assignee: Brother Kogyo Kabushiki Kaisha, Nagoya, Aichi (JP)

( * ) Notice: Subject to any disclaimer, the term of this patent is extended or adjusted under 35 U.S.C. 154(b) by 51 days.

(21) Appl. No.: 15/071,560

(22) Filed: Mar. 16, 2016

(65) Prior Publication Data
US 2016/0275662 A1  Sep. 22, 2016

(30) Foreign Application Priority Data
Mar. 17, 2015  (JP) .................................. 2015-053296

(51) Int. Cl.
G06K 9/48 (2006.01)
G06T 3/00 (2006.01)
G06T 7/30 (2017.01)

(52) U.S. Cl.
CPC .............. *G06T 3/0068* (2013.01); *G06T 7/30* (2017.01); *G06T 2200/32* (2013.01); *G06T 2207/10008* (2013.01); *G06T 2207/30176* (2013.01)

(58) Field of Classification Search
CPC ....... G06T 2200/32; G06T 2207/10008; G06T 2207/30176; G06T 3/0068; G06T 7/30
See application file for complete search history.

(56) References Cited

U.S. PATENT DOCUMENTS 5,481,375 A   1/1996  Eto et al.
6,148,118 A  11/2000  Murakami et al.
(Continued)

FOREIGN PATENT DOCUMENTS

JP  H05-342345 A  12/1993
JP  H06-14157 A   1/1994
(Continued)

OTHER PUBLICATIONS

Related U.S. Appl. No. 14/868,595, filed Sep. 29, 2016.
Office Action dated Aug. 26, 2016 from related U.S. Appl. No. 14/868,595, filed Sep. 29, 2015.

*Primary Examiner* — Phuoc Tran
(74) *Attorney, Agent, or Firm* — Scully, Scott, Murphy & Presser, PC

(57) ABSTRACT

An image processing device acquires first and second image data respectively representing first and second images. The first image includes an object image showing a part of an object. The second image shows another part of the object. The first image and the object image respectively include an edge and an object-image edge with respect to a direction. The first image includes first pixels that is located between the edge and the object-image edge and not included in the first object image. The device selects one of arrangement methods according to a condition that the number of first pixels continuously arranged in the direction is larger than a prescribed level. The device determines a relative position between the first and second images using the selected method. The device generates arranged image data representing an arranged image in which the first and second images are arranged according to the relative position.

16 Claims, 19 Drawing Sheets

(56) References Cited

U.S. PATENT DOCUMENTS

| | | | |
|---|---|---|---|
| 6,507,415 B1 | 1/2003 | Toyoda et al. | |
| 7,369,266 B2 * | 5/2008 | Miki | G06T 3/4038 358/1.12 |
| 2004/0247179 A1 * | 12/2004 | Miwa | G06K 9/48 382/173 |
| 2006/0209366 A1 | 9/2006 | Edwards et al. | |
| 2012/0250100 A1 | 10/2012 | Kuraya et al. | |

FOREIGN PATENT DOCUMENTS

| JP | H09-121277 A | 5/1997 |
|---|---|---|
| JP | H11196261 A | 7/1999 |
| JP | 2012-212963 A | 11/2012 |

* cited by examiner

SCAN PATTERN A

SCAN PATTERN A
READING OPERATION
(FIRST PASS)

SCAN PATTERN A
READING OPERATION
(SECOND PASS)

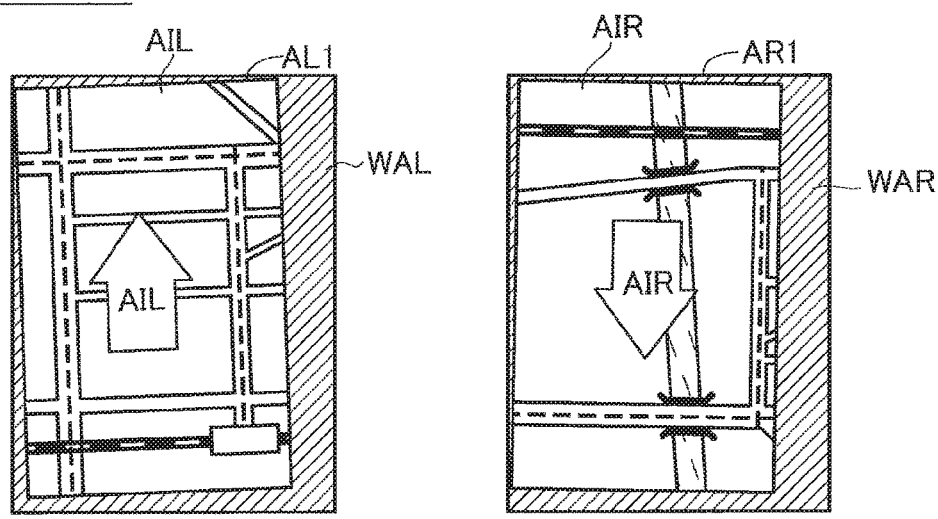
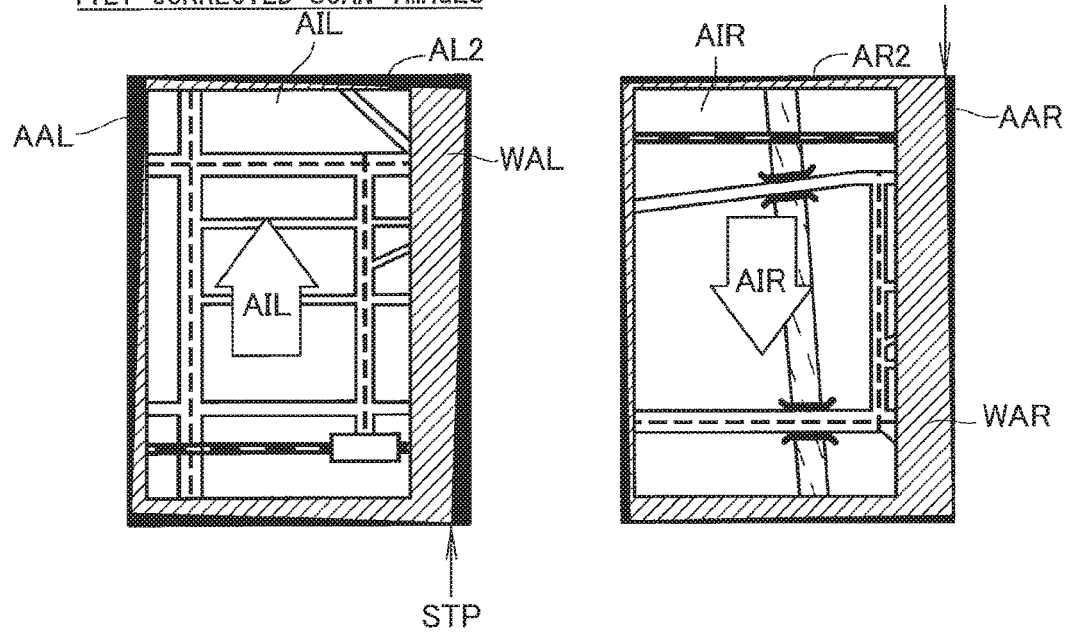

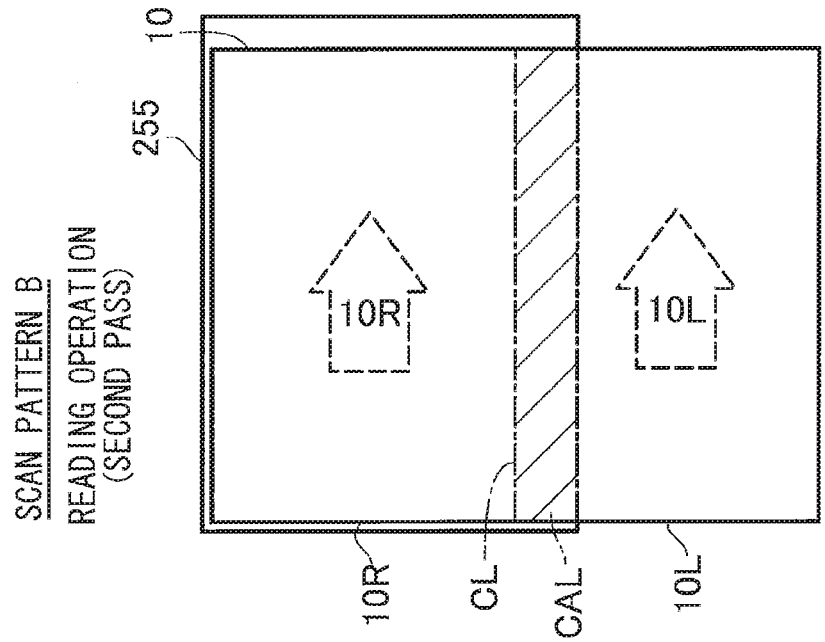
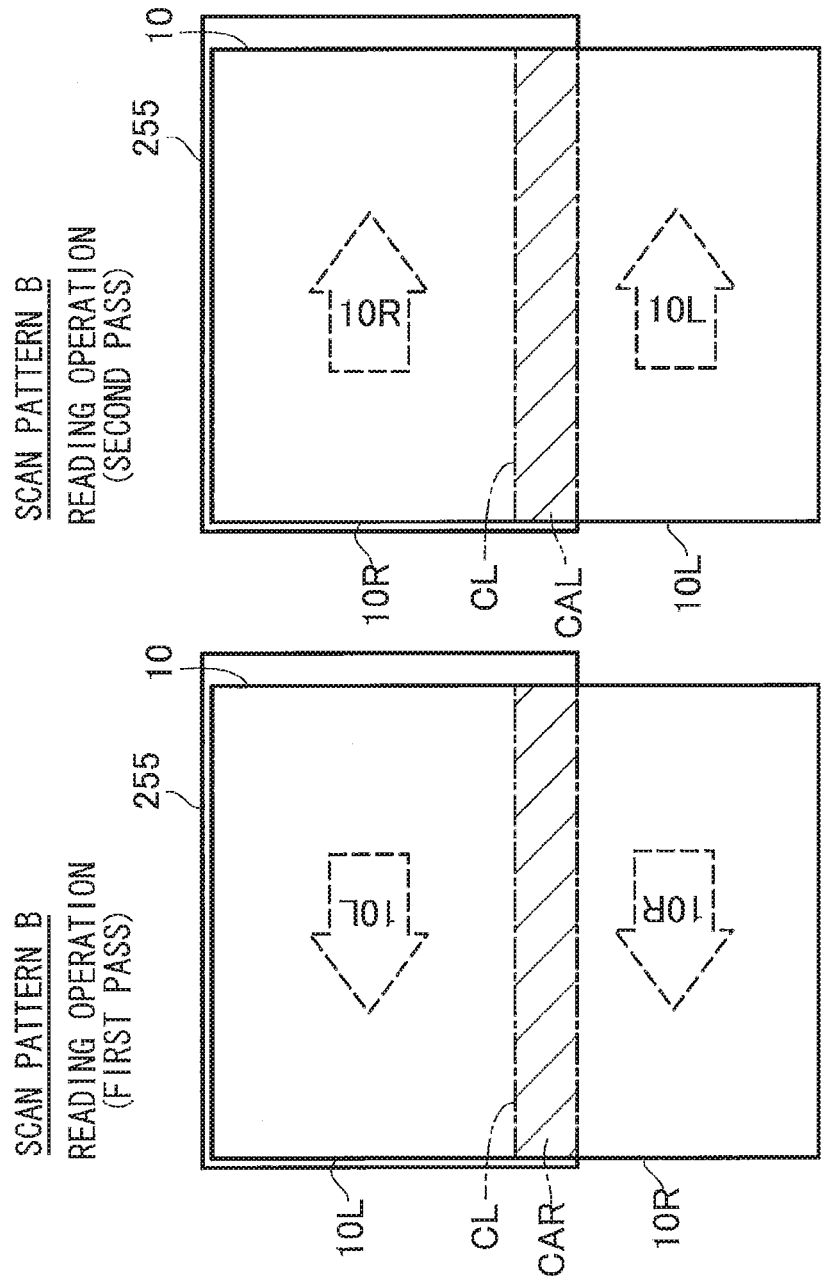

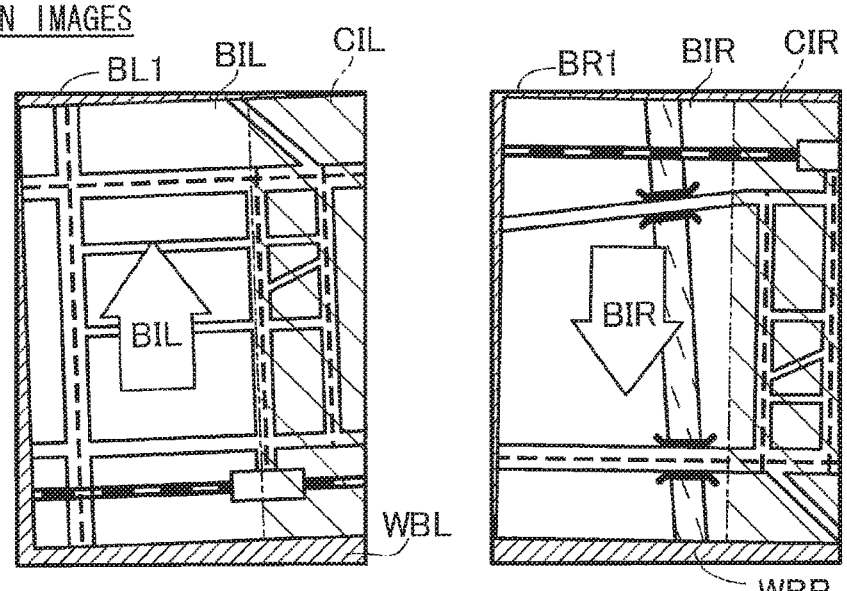
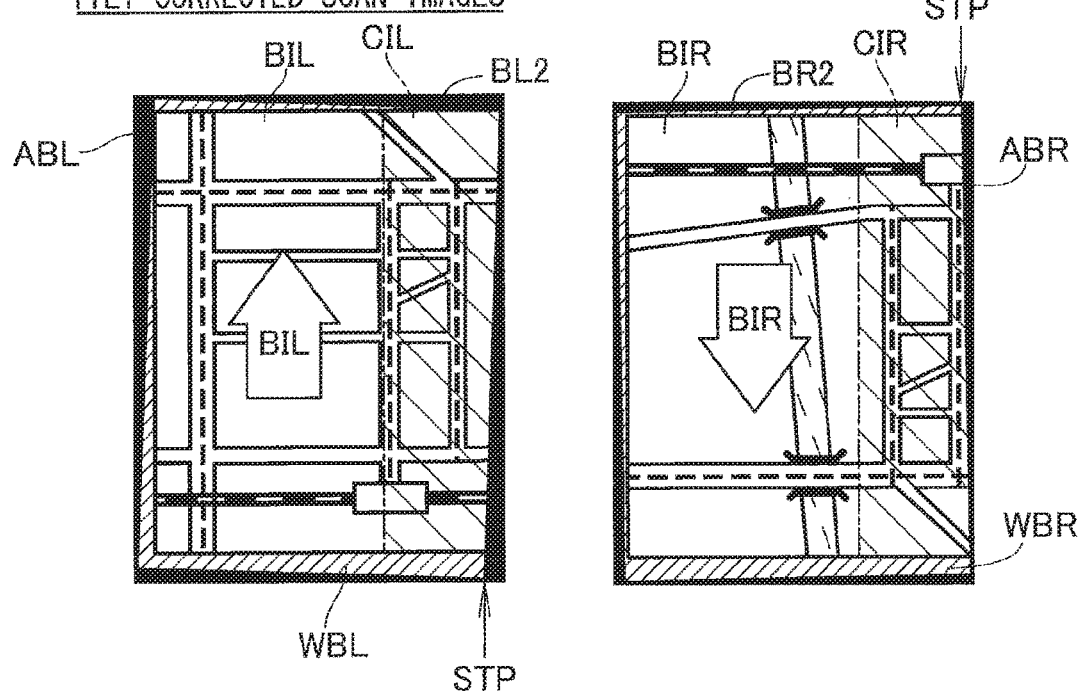

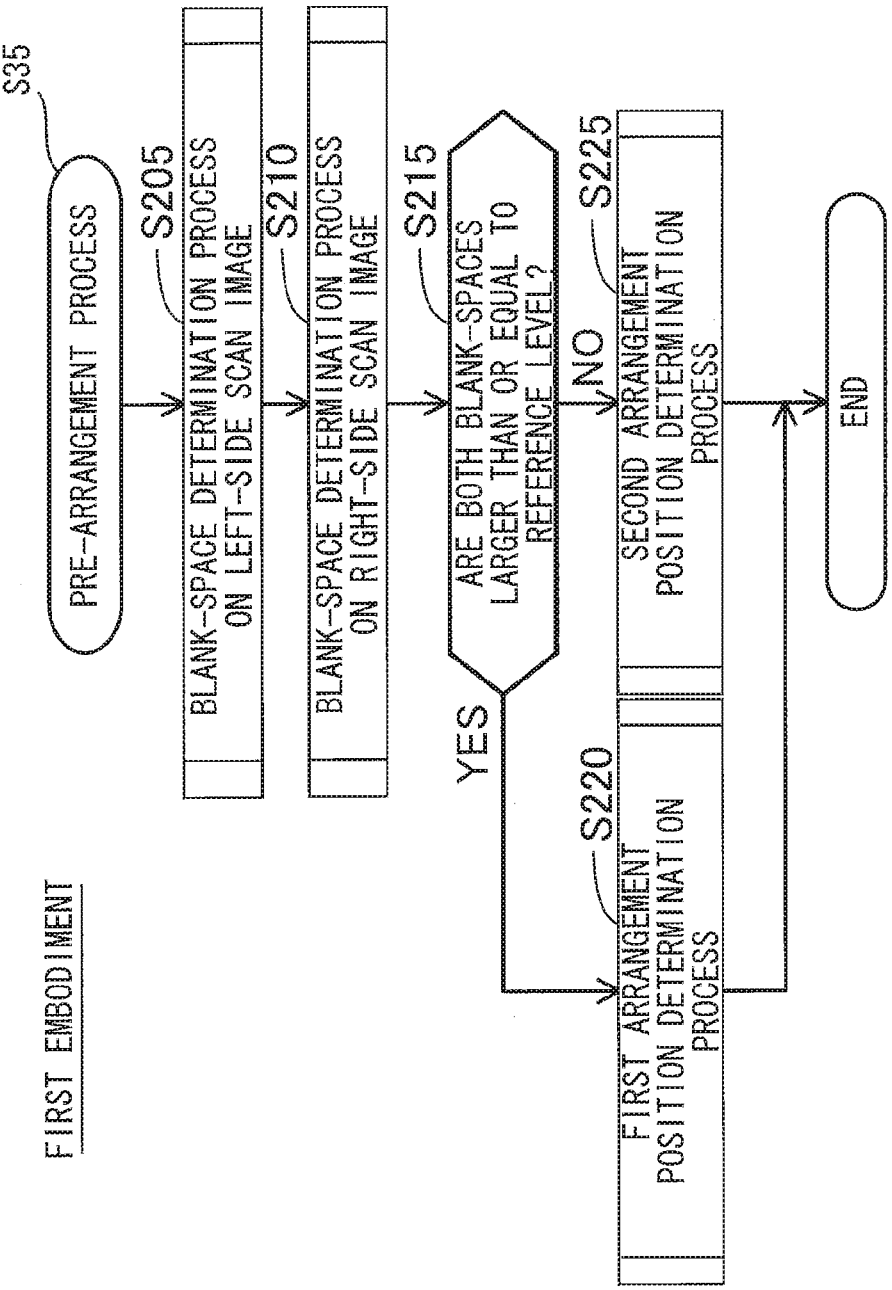

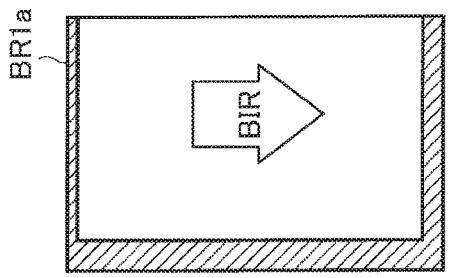
FIG. 17(C) SECOND EMBODIMENT
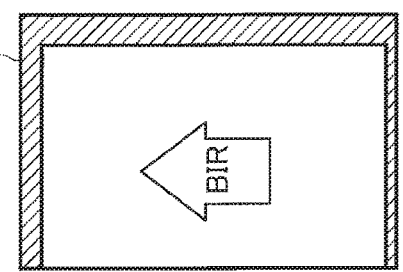
FIG. 17(D) SECOND EMBODIMENT
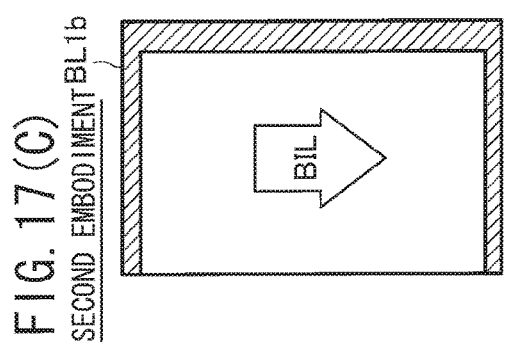
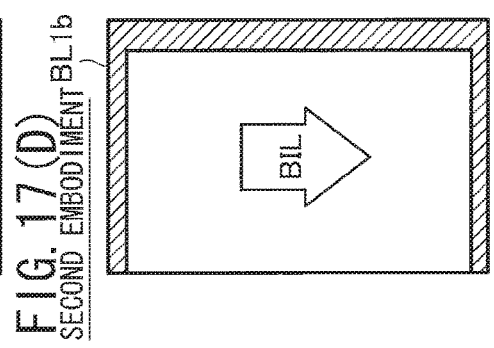
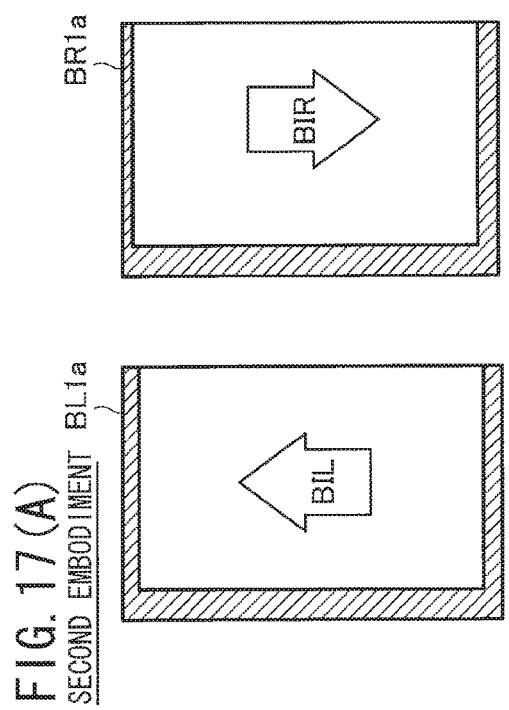
FIG. 17(A) SECOND EMBODIMENT
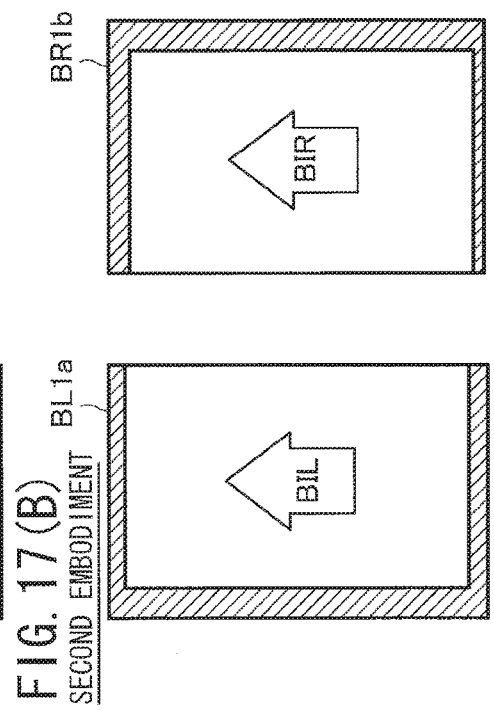
FIG. 17(B) SECOND EMBODIMENT

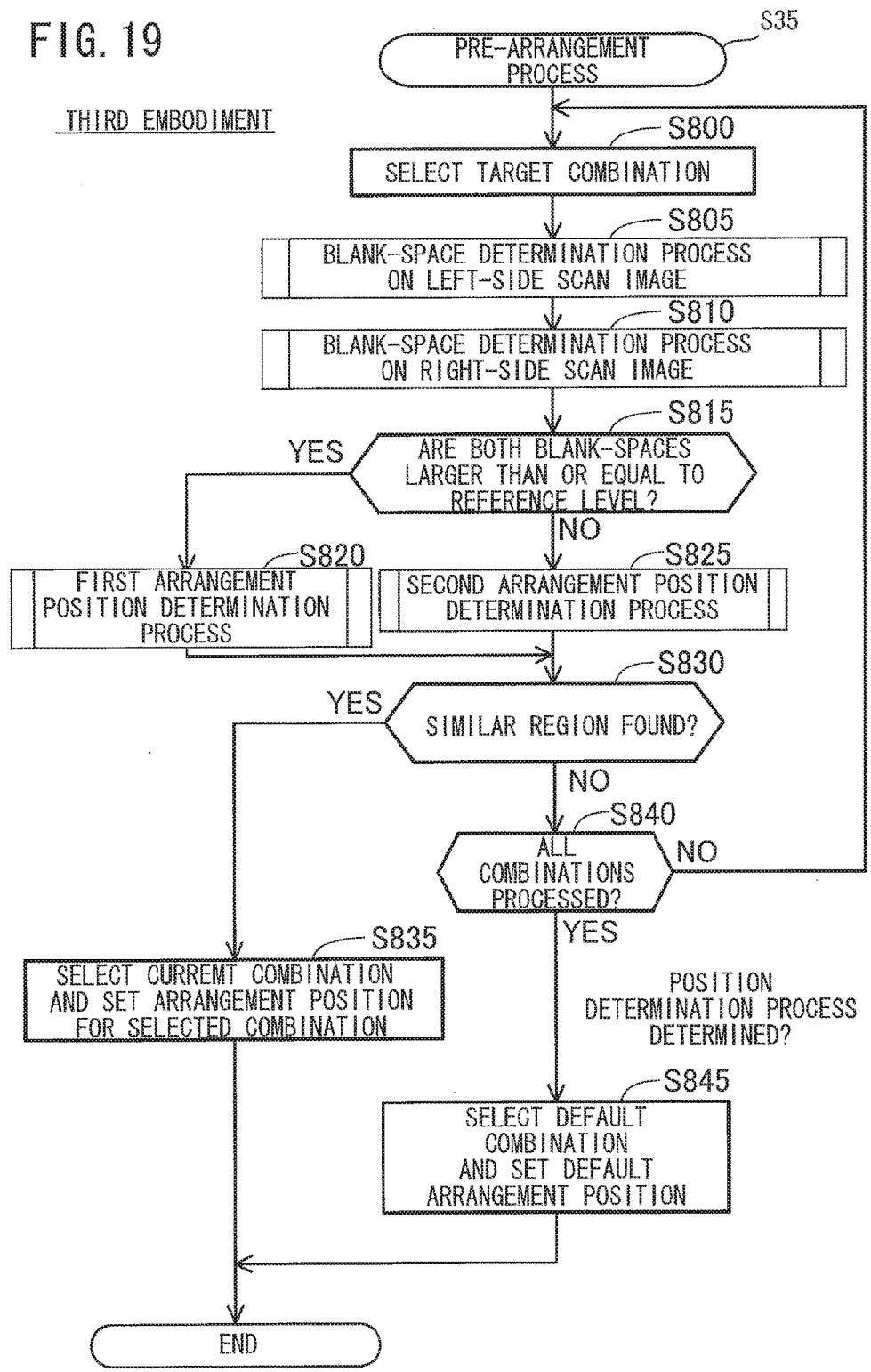

IMAGE PROCESSING DEVICE SELECTING ARRANGEMENT METHOD FOR GENERATING ARRANGED IMAGE DATA

CROSS REFERENCE TO RELATED APPLICATION

This application claims priority from Japanese Patent Application No. 2015-053296 filed Mar. 17, 2015. The entire content of the priority application is incorporated herein by reference.

TECHNICAL FIELD

The present disclosure relates to a technique for generating arranged image data representing an arranged image where a first image and a second image are disposed so as to show one object.

BACKGROUND

There is a well-known technique for inputting a plurality of original images by reading a document in two passes and outputting an image where the plurality of original images are combined. According to this technique, two methods are used. One is a method for combining the plurality of original images by placing the images on positions determined by pattern matching, and the other is a method for combining the images at positions where the images are simply arranged. One of the two methods are selected by a user, for example. When the pattern-matching method is executed according to a selection of the user, but ends in failure, the method for simply arranging the two images is executed.

SUMMARY

However, according to the above-mentioned technique, a user selects in advance a method that should be performed. However, if a user is unable to select an appropriate method because of a lack of knowledge, an appropriate method may not be selected.

In view of the foregoing, it is an object of the present disclosure to provide a technique for appropriately selecting an image arrangement method when generating image data representing an arranged image where a first image and a second image are disposed so as to show one object (e.g., one original).

In order to attain the above and other objects, the disclosure provides an image processing device. The image processing device includes a processor, and a memory storing computer-readable instructions therein. The computer-readable instructions, when executed by the processor, causes the image processing device to perform: acquiring first image data representing a first image and second image data representing a second image, the first image including a first object image showing a part of a target object, the second image including a second object image showing another part of the target object, the first image including a first edge with respect to a first direction, the first object image including a first object-image edge with respect to the first direction, the first image including a plurality of first pixels located between the first edge and the first object-image edge, and the plurality of first pixels not being included in the first object image; selecting a first arrangement method when a specific condition is met, otherwise, selecting a second arrangement method when the specific condition is not met, the specific condition including a first condition indicating that the number of the plurality of the first pixels continuously arranged in the first direction is larger than a prescribed level; determining a relative position between the first image and the second image by using the selected one of the first arrangement method and the second arrangement method; and generating arranged image data representing an arranged image in which the first image and the second image are arranged according to the relative position so that the arranged image shows the target object.

According to another aspect, the disclosure provides a non-transitory computer readable storage medium storing a set of program instructions installed on and executed by a computer. The program instructions includes: acquiring first image data representing a first image and second image data representing a second image, the first image including a first object image showing a part of a target object, the second image including a second object image showing another part of the target object, the first image including a first edge with respect to a first direction, the first object image including a first object-image edge with respect to the first direction, the first image including a plurality of first pixels located between the first edge and the first object-image edge, and the plurality of first pixels not being included in the first object image; selecting a first arrangement method when a specific condition is met, otherwise, selecting a second arrangement method when the specific condition is not met, the specific condition including a first condition indicating that the number of the plurality of the first pixels continuously arranged in the first direction is larger than a prescribed level; determining a relative position between the first image and the second image by using the selected one of the first arrangement method and the second arrangement method; and generating arranged image data representing an arranged image in which the first image and the second image are arranged according to the relative position so that the arranged image shows the target object.

According to another aspect, the disclosure provides a method. The method includes: acquiring first image data representing a first image and second image data representing a second image, the first image including a first object image showing a part of a target object, the second image including a second object image showing another part of the target object, the first image including a first edge with respect to a first direction, the first object image including a first object-image edge with respect to the first direction, the first image including a plurality of first pixels located between the first edge and the first object-image edge, and the plurality of first pixels not being included in the first object image; selecting a first arrangement method when a specific condition is met, otherwise, selecting a second arrangement method when the specific condition is not met, the specific condition including a first condition indicating that the number of the plurality of the first pixels continuously arranged in the first direction is larger than a prescribed level; determining a relative position between the first image and the second image by using the selected one of the first arrangement method and the second arrangement method; and generating arranged image data representing an arranged image in which the first image and the second image are arranged according to the relative position so that the arranged image shows the target object.

BRIEF DESCRIPTION OF THE DRAWINGS

The particular features and advantages of the disclosure as well as other objects will become apparent from the following description taken in connection with the accompanying drawings, in which:

FIG. 5(A) is an explanatory diagram illustrating scan images obtained according to the scan pattern A;

FIG. 5(B) is an explanatory diagram illustrating tilt-corrected scan images;

FIG. 6(A) is an explanatory diagram illustrating a first reading operation according to the scan pattern B;

FIG. 6(B) is an explanatory diagram illustrating a second reading operation according to the scan pattern B;

FIG. 7(A) is an explanatory diagram illustrating scan images obtained according to the scan pattern B;

FIG. 7(B) is an explanatory diagram illustrating tilt-corrected scan images;

FIG. 8 is a flowchart illustrating a pre-arrangement process according to the first embodiment;

FIGS. 17(A)-17(D) are explanatory diagrams illustrating combinations of scan images according to a second embodiment;

FIG. 19 is a flowchart illustrating a pre-arrangement process according to a third embodiment.

DETAILED DESCRIPTION

A. First Embodiment

A-1: Structure of an Image Processing System 1000

Figure 1:
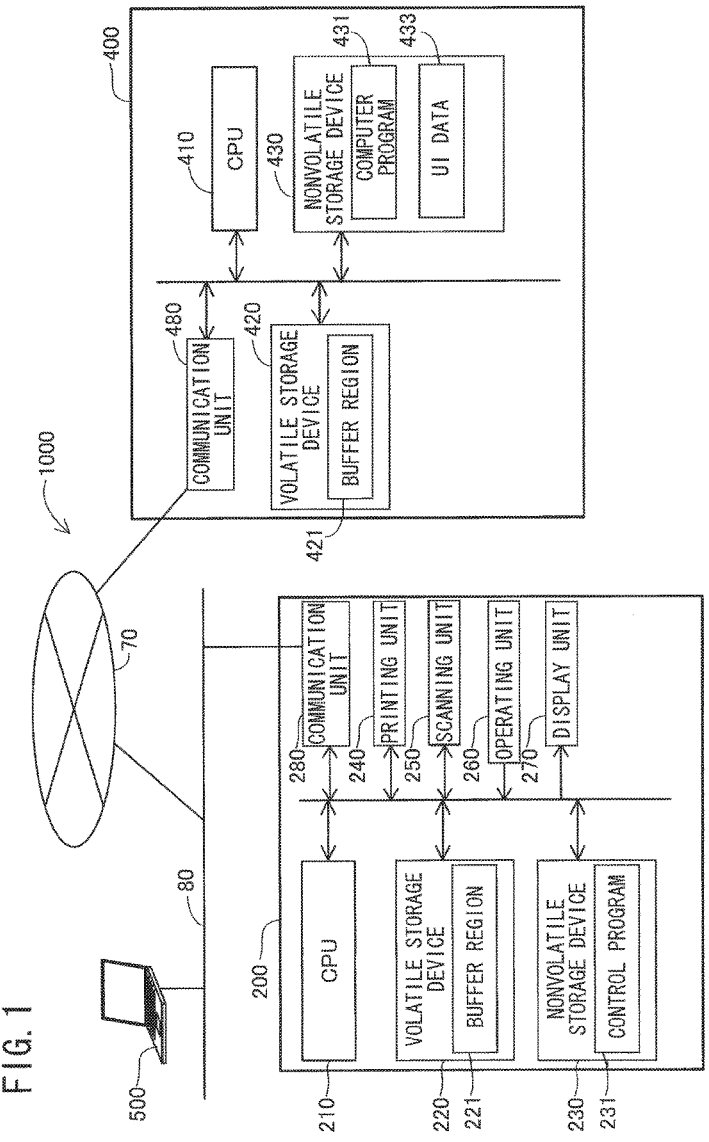
FIG. 1 is a block diagram showing a structure of an image processing system according to a first embodiment.

FIG. 1 is a block diagram showing the structure of an image processing system 1000 according to a first embodiment. The image processing system 1000 includes a server 400 functioning as an image processing device, and a multifunction peripheral 200. The server 400 is connected to an Internet 70. The multifunction peripheral 200 is also connected to the Internet 70 via a local area network (LAN) 80. Consequently, the server 400 and the multifunction peripheral 200 can communicate with each other via the LAN 80 and the Internet 70. Further, a personal computer 500 possessed by the user of the multifunction peripheral 200 may be connected to the LAN 80. In this case, the image processing system 1000 may not include the personal computer 500.

The server 400 includes a CPU 410, as an example of the processor, a volatile storage device 420 such as DRAM, a nonvolatile storage device 430 such as a hard disk drive and a flash memory, and a communication unit 480 including an interface for connecting to the Internet 70 or other networks. The volatile storage device 420 is provided with a buffer region 421 for temporarily storing various intermediate data generated when the CPU 410 performs processes. The nonvolatile storage device 430 stores a computer program 431, and user interface (UI) data 433.

The computer program 431 and the UI data 433 are installed on the server 400 by the administrator of the server 400, for example, by uploading the data to the server 400 through the Internet 70. Alternatively, the computer program 431 and the UI data 433 may be supplied on a DVD-ROM or other storage media and installed on the server 400 by the administrator. The CPU 410 executes the computer program 431 to implement an image process described later.

The multifunction peripheral 200 includes a CPU 210 as an example of a processor, a volatile storage device 220 such as DRAM, a nonvolatile storage device 230 such as flash memory and a hard disk drive, a printing unit 240, a scanning unit 250, an operating unit 260 such as a touch-screen, buttons, or the like, a display unit 270 such as a liquid crystal display, and a communication unit 280 for communicating with external devices. The communication unit 280 includes an interface for connecting to the LAN 80 or another network, and an interface for connecting to a USB memory or another external storage device, for example.

The volatile storage device 220 is provided with a buffer region 221 that temporarily stores various data generated when the CPU 210 performs processes. The nonvolatile storage device 230 stores a control program 231. The control program 231 can be provided by preliminary storing in the nonvolatile storage device 230 during production of the printer 100. Alternatively, the control program 231 can be provided by being downloaded from an external server through the internet, or can be provided through CD-ROM storing the control program.

The printing unit 240 executes printing operations according to an inkjet or laser printing method, for example. The scanning unit 250 produces scan data representing a color or grayscale image by optically reading an original using a photoelectric conversion element such as a CCD (Charge Coupled device) sensor and CMOS (Complementary Metal-Oxide Semiconductor) sensor. The scanning unit 250 is provided with a flatbed 255 as a platen for reading an original (see FIGS. 4(B) and 4(C)).

The CPU 210 controls the multifunction peripheral 200 by executing the control program 231. For example, the CPU 210 can control the printing unit 240 and the scanning unit 250 to execute a copy process, a print process, and a scan process. Further, the CPU 210 can execute a service use process by accessing to the server 400 to use services provided thereby.

A-2: Operations of the Image Processing System 1000

Figure 2:
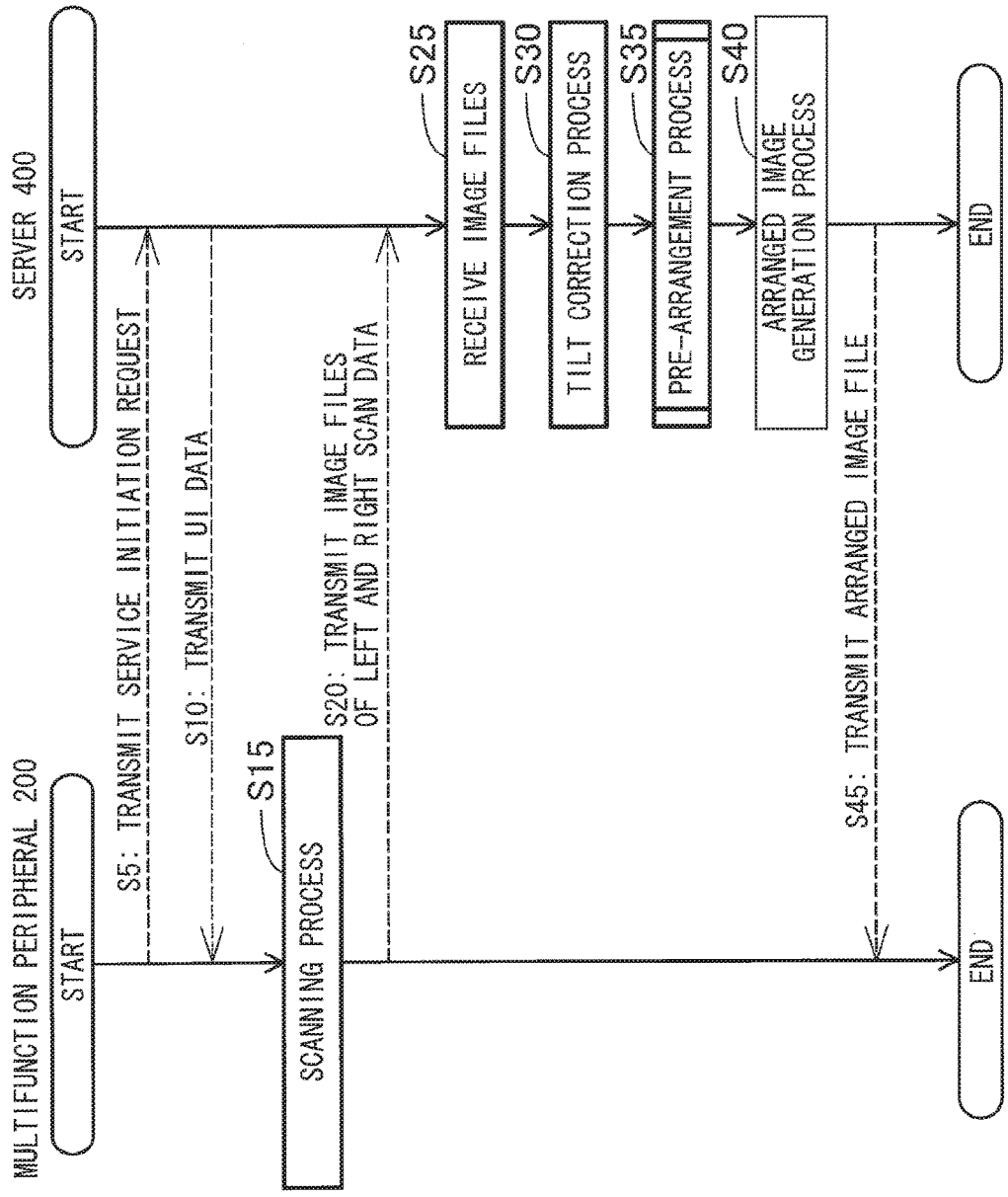
FIG. 2 is a diagram illustrating a sequence of operations performed by the image processing system.

FIG. 2 shows the sequence of operations performed by the image processing system 1000. The multifunction peripheral 200 initiates the process in FIG. 2 upon receiving a command from the user to use the image generation service provided by the server 400. This service will be described later in greater detail. This service is to produce arranged image data representing an arranged image of a single target (for example, an original 10 described later) by using a plurality of segmental images represented by a plurality of sets of scan data. As will be described later in greater detail, a plurality of sets of scan data is generated when the scanning unit 250 performs a plurality of passes to read an original that is larger than the maximum size that the scanning unit 250 can read in one pass, for example.

In S5 at the beginning of the process in FIG. 2, the CPU 210 of the multifunction peripheral 200 transmits a service initiation request to the server 400. Upon receiving this request, the CPU 410 of the server 400 selects UI data required for providing the image generation service from the UI data 433 shown in FIG. 1, and in S10 transmits this UI data to the multifunction peripheral 200. The UI data specifically includes window data representing a user interface window (hereinafter called a "UI window"), and control data. The control data includes various data required for the multifunction peripheral 200 to perform a prescribed process, such as the scan process described later in S15, using the UI window. For example, the control data may include data with which the multifunction peripheral 200 needs to perform processes, such as destination address of an image file. The process to be executed by the multifunction peripheral 200 is for example a process for transmitting the image file to the server 400 in S20 described later.

In S15 the CPU 210 executes a scanning process to generate a plurality of sets of scan data based on the UI data received in S10. In the reading process of the embodiment, the CPU 210 generates two sets of scan data by reading a first approximate half portion of an original prepared by the user, and subsequently reading the remaining approximate half portion of the original prepared by the user. The scan data generated in the embodiment is RGB image data that includes RGB component values (each value indicating one of 256 gradations between 0 and 255, for example) for each pixel in the image.

Figure 3:
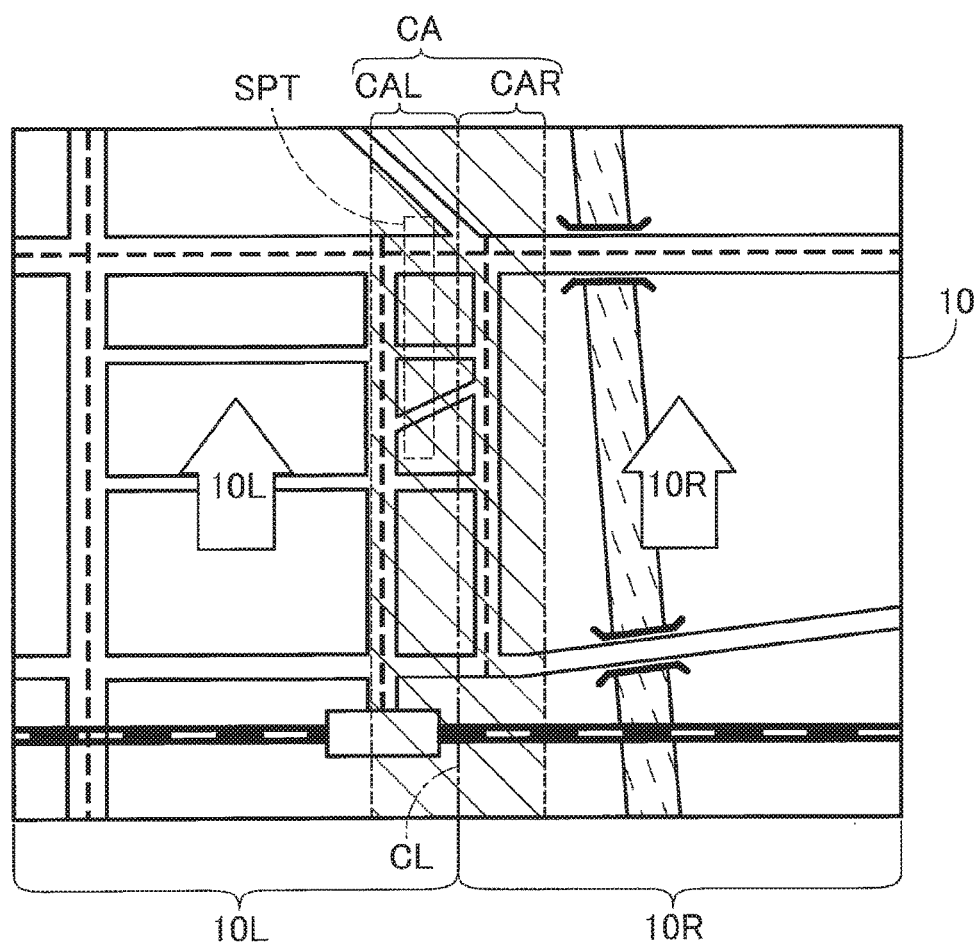
FIG. 3 is a diagram illustrating an example of an original used in the first embodiment.

FIG. 3 is a diagram showing one example of an original. The size of the original 10 is A3 in this example. A line CL is located at the center of the A3-size original 10 in the longitudinal direction, and is parallel to the short side of the original 10. A left region 10L is a left-half region of the original 10, or is a region on the left side of the line CL. A right region 10R is a right-half region of the original 10, or is a region on the right side of the line CL of the original 10. The size of the left region 10L and the size of the right region 10R are A4. That is, the A3-size and A4-size are paper sizes defined by ISO (International Organization for Standardization) 216.

Arrows 10L and 10R in FIG. 3 indicate the positions and directions of the regions 10L and 10R. The regions 10L and 10R are disposed at the positions where the arrows are disposed and in the directions indicated by the arrows. That is, arrows shown in drawings indicate an upward direction of the original 10 (or an image in the original 10). Drawings, such as FIGS. 4(A)-4(C), do not show images inside the regions 10L and 10R. In these drawings, the positions and directions of the regions 10L and 10R are indicated by the arrows with reference symbols.

Figure 4A:
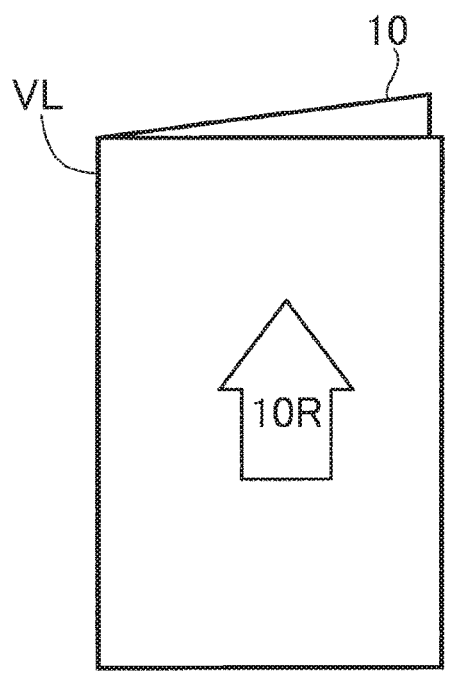
FIG. 4 (A) is an explanatory diagram illustrating a scan pattern A.
FIG. 4(B) is an explanatory diagram illustrating a first reading operation according to the scan pattern A.
FIG. 4(C) is an explanatory diagram illustrating a second reading operation according to the scan pattern A.
Figure 4B:
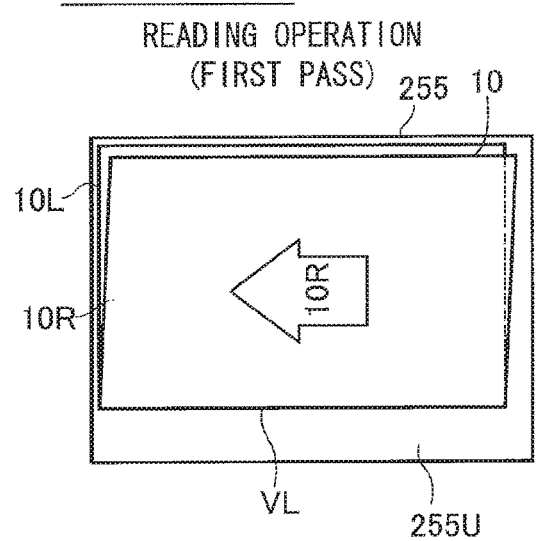
Figure 4C:
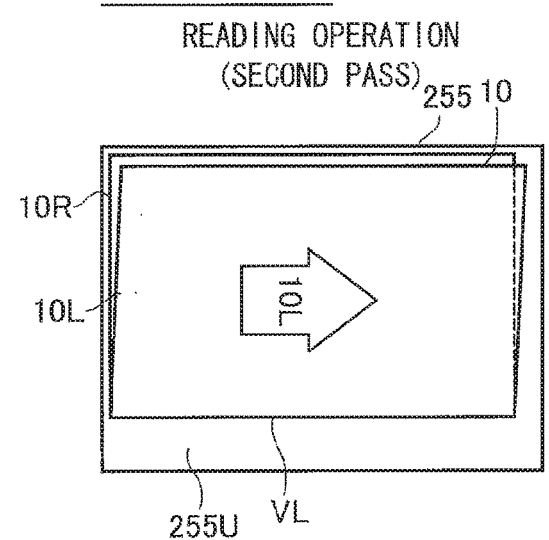

FIGS. 4(A)-4(C) are explanatory diagrams illustrating a scan pattern A. In the embodiment, the longitudinal length of the flatbed 255 is slightly longer (a few millimeters, for example) than the longitudinal dimension of an A4-size sheet (297 mm). The short side length of the flatbed 255 is also slightly larger (a few millimeters, for example) than the short side dimension of a letter-size sheet (215.9 mm). Here, a letter-size sheet is defined by ANSI/ASME (American National Standards Institute/American Society of Mechanical Engineers) Y14.1. In the embodiment, the maximum size of an original that can be read in one reading operation in the embodiment is larger than an A4-size and smaller than an A3-size sheet. In the embodiment, the multifunction peripheral 200 performs the reading process two times (two passes) in order to read the A3-size original 10.

The scan process of the embodiment uses one of the methods, scan pattern A illustrated in FIGS. 4(A) and 4(B) or scan pattern B illustrated in FIGS. 6(A) and 6(B), in order to read in two passes, thereby generating two sets of scan data. More specifically, the two scan patterns A and B are explained to a user in advance via an UI screen, which is displayed on a manual (not shown) or the display unit 270. According to one of the two scan patterns A and B, the user operates the scanning unit 250 to read the original 10 in two passes.

(Scan Pattern A)

According to the scan pattern A, as shown in FIG. 4(A), the original 10 is folded in half along a line VL, before being read by the scanning unit 250. The line VL is at the same position as the dashed line CL of FIG. 3. The size of the half-folded original 10 is A4. The right region 10R is positioned on one side of the half-folded original 10, and the left region 10L is positioned on the other side.

During the first reading process (first pass), left-side scan data that represents an image within the left region 10L is generated. More specifically, as shown in FIG. 4(B), a user puts the half-folded original 10 on the document table 255 so that the left region 10L faces the document table 255's side and that the right region 10R faces the opposite side of the document table 255. At this time, the line VL is on the near side (or the lower side of FIG. 4(B)), and the far left corner (or upper left corner in FIG. 4(B)) of the original 10 is approximately at the far left corner (upper left corner in FIG. 4(B)) of the document table 255. After the user inputs a read command to the multifunction peripheral 200, the CPU 210 controls the scanning unit 250 to read the left region 10L and generate the left-side scan data.

During the second reading process (second pass), right-side scan data that represents an image within the right region 10R is generated. More specifically, as shown in FIG. 4(C), a user puts the half-folded original 10 on the document table 255 so that the right region 10R faces the document table 255's side and that the left region 10L faces the opposite side of the document table 255. At this time, the line VL is on the near side (or the lower side of FIG. 4(C)), and the far left corner (or upper left corner in FIG. 4(C)) of the original 10 is approximately at the far left corner (upper left corner in FIG. 4(C)) of the document table 255. After the user inputs a read command to the multifunction peripheral 200, the CPU 210 controls the scanning unit 250 to read the right region 10R and generate the right-side scan data.

FIGS. 5(A) and 5(B) are explanatory diagrams illustrating one example of a scan image created according to the scan pattern A. FIG. 5(A) shows a left-side scan image AL1 represented by left-side scan data, and a right-side scan image AR1 represented by right-side scan data. The left-side scan image AL1 includes a left-side original image AIL, which shows the left region 10L of the original 10, and a blank space WAL. The right-side scan image AR1 includes a right-side original image AIR, which shows the right region 10R of the original 10, and a blank space WAR. The blank spaces WAL and WAR are regions generated by reading the document table 255. Therefore, the blank spaces WAL and WAR have a value (RGB value) representing the color of the document table 255. In this embodiment, the color of the blank spaces WAL and WAR is white. However, the color of the blank spaces WAL and WAR may be black or gray. In the scan images AL1 and AR1, the blank spaces WAL and WAR are regions outside the original images AIL and AIR.

In the scan images AL1 and AR1, the original images AIL and AIR are tilted relative to the edges of the scan images AL1 and AR1. This is because the original 10 was inclined on the document table 255 when scan data was generated.

The scan images AL1 and AR1 are rectangular in shape corresponding to the shape of the document table 255 as shown in FIGS. 4(B) and 4(C). The scan images AL1 and AR1 represent images arranged on the document table 255, with the direction along the longitudinal side of the document table 255 corresponding to a vertical direction, and the leftward direction of the document table 255 shown in FIGS. 4(B) and 4(C) corresponding to upward direction. The upward direction (or direction of arrow in FIG. 4(B)) of the original 10 on the document table 255 when reading the left region 10L is opposite to the upward direction (or direction of arrow in FIG. 4C) of the original 10 on the document table 255 when reading the right region 10R. Accordingly, the upward direction of the left-side original image AIL in the scan image AL1 is opposite to the upward direction of the right-side original image AIR in the scan image AR1.

The scan images AL1 and AR1 shown in FIG. 5(A) are generated by the scan pattern A. In the images AL1 and AR1, relatively-large blank spaces WAL and WAR exist on the right ends of the original images AIL and AIR to the right ends of the scan images AL1 and AR1. This is because, as shown in FIGS. 4(B) and 4(C), there is a region 255U where no original 10 is disposed on the near side of the document table 255 (or lower side in FIGS. 4(B) and 4(C)) when the folded original 10 is on the document table 255.

(Scan Pattern B)

FIGS. 6(A) and 6(B) are explanatory diagrams illustrating the scan pattern B. According to the scan pattern B, the original 10 is put on the document table 255 without being folded. During the first reading process (first pass) according to the scan pattern B, left-side scan data is generated. The left-side scan data represents an image inside a region including the left region 10L and a partial region CAR of the right region 10R that abuts on the left region 10L. More specifically, as shown in FIG. 6(A), the user puts the original 10 on the document table 255 so that a document surface on which the image of the original 10 is disposed faces the document table 255 and that the left region 10L of the document surface is positioned at the far side (or upper side in FIG. 6(A)) and the right region 10R of the document surface is positioned at the near side (or lower side in FIG. 6(A)). After the user inputs a read command to the multifunction peripheral 200, the CPU 210 controls the scanning unit 250 to read the left region 10L and the partial region CAR and generate the left-side scan data.

During the second reading process (second pass) according to the scan pattern B, right-side scan data is generated. The right-side scan data represents an image inside a region including the right region 10R and a partial region CAL of the left region 10L that abuts on the right region 10R. More specifically, as shown in FIG. 6(B), the user puts the original 10 on the document table 255 so that the document surface faces the document table 255 and that the right region 10R of the document surface is positioned at the far side (or upper side in FIG. 6(B)) and the left region 10L of the document surface is positioned at the near side (or lower side in FIG. 6(B)). After the user inputs the read command to the multifunction peripheral 200, the CPU 210 controls the scanning unit 250 to read the right region 10R and the partial region CAL and generate the right-side scan data.

In each of the two reading process, the original 10 is placed on the document table 255 so that the far left corner of the original 10 is approximately on the far left corner of the document table 255, similarly to the scan pattern A.

FIGS. 7(A) and 7(B) are explanatory diagrams illustrating an example of scan images generated by the scan pattern B. FIG. 7(A) shows a left-side scan image BL1 represented by the left-side scan data and a right-side scan image BR1 represented by the right-side scan data. The left-side scan image BL1 includes a left-side original image BIL, which represents an image in the left region 10L of the original 10 and the partial region CAR, and a blank space WBL. The right-side scan image BR1 includes a right-side original image BIR, which represents an image in the left region 10L of the original 10 and the partial region CAL, and a blank space WBR. The original images BIL and BIR respectively includes images CIL and CIR that represent a central portion CA in the horizontal direction (or a region consisting of the partial regions CAL and CAR) of the original 10 shown in FIG. 3.

According to the scan pattern B, the upward direction of the left-side original image BIL in the left-side scan image BL1 is opposite to the upward direction of the right-side original image BIR in the right-side scan image BR1, similarly to the scan images AL1 and AR1 (FIG. 5(A)) according to the scan pattern A.

In the scan images BL1 and BR1 of FIG. 7(A) generated by the scan pattern B, there are almost no blank spaces WBL and WBR between the right ends of the original images BIL and BIR and the right ends of the scan images BL1 and BR1, unlike the scan pattern A. This is because, as shown in FIGS. 6(A) and 6(B), there is no region where the original 10 is not disposed on the near side (or lower side in FIGS. 6A and 6B) of the document table 255 when the unfolded original 10 is placed on the document table 255.

In the scan process of S15, the left-side scan data and the right-side scan data are converted into files of a prescribed format, such as image files of JPEG (Joint Photographic Experts Group) format.

In S20 of FIG. 2, the CPU 210 transmits the image file of the left-side scan data (also referred to as left-side image file), the image file of the right-side scan data (also referred to as right-side image file) to the server 400. In S25, the CPU 410 of the server 400 receives the two image files. The CPU 410 acquires the left-side scan data and right-side scan data from the image files and stores the data in the buffer region 421. For example, if the image files in JPEG format are used, the CPU 410 acquires scan data that are RGB image data converted from the image files by a prescribed conversion process, and stores the scan data in the buffer region 421.

In S30, the CPU 410 performs a tilt correction process on the left-side scan data and the right-side scan data. More specifically, the CPU 410 performs well-known processes, such as Hough transform and edge detection processes, on the left-side scan data in order to detect the upper end of the left-side original image (AIL or BIL) inside the left-side scan image (AL1 or BL1). The CPU 410 rotates the left-side scan image (AL1 or BL1) so that the upper end of the left-side original image (AIL or BIL) is parallel to the upper end of the left-side scan image (AL1 or BL1). In this manner, the CPU 410 generates the corrected left-side scan data representing the corrected left-side scan image. In this case, instead of the upper end, any end of the left-side original image (the left end or the lower end) may be detected. Here, the right end is not preferable for subject to the detection. This is because, the right end of the left-side original image (AIL or BIL) of the left-side scan image (AL1 or BL1) is not an end of the original 10. For example, the right end of the left-side original image AIL represents the line VL of the original 10. The right end of the left-side original image BIL represents a portion of the right region 10R of the original 10.

In a blank-space amount determination process described later, a blank-space line is determined for each of lines extending in the vertical direction. By executing the tilt correction process in advance, the subsequent blank-space amount determination process can accurately determine whether the amount of blank space is greater than or equal to a reference amount, even if the original image is tilting inside the scan image.

The CPU 410 performs the same tilt correction process on the right-side scan data. The CPU 410 rotates the right-side scan image (AR1 or BR1) so that the upper end of the right-side original image (AIR or BIR) is parallel to the upper end of the right-side scan image (AR1 or BR1). In this manner, the CPU 410 generates the corrected right-side scan data representing the corrected right-side scan image.

FIG. 5(B) shows the corrected left-side scan image AL2 and the corrected right-side scan image AR2 when the scan pattern A is used. The corrected left-side scan image AL2 includes an additional region AAL. The additional region AAL includes additional pixels. The additional region AAL is added to and positioned outside of the left-side original image AIL and the blank space WAL. This is because, in the following processes, the corrected left-side scan image AL2 is treated as a rectangular image whose upper and lower ends are parallel to the horizontal direction and whose left and right ends are parallel to the up-to-down direction. The CPU 410 generates a mask image (not shown) by binarizing pixels inside the additional region AAL and pixels in other regions and stores the mask image in the buffer region 421 so that the CPU 410 will be able to identify and distinguish the additional region AAL from the other regions.

Similarly to the corrected left-side scan image AL2, the corrected right-side scan image AR2 includes an additional region AAR. The additional region AAR includes additional pixels. The additional region AAR is added to and positioned outside of the right-side original image AIR and the blank space WAR. The CPU 410 generates a mask image (not shown) for identifying and distinguishing the additional region AAR from other regions (AIR and WAR) and stores the mask image in the buffer region 421.

FIG. 7(B) shows the corrected left-side scan image BL2 and the corrected right-side scan image BR2 when the scan pattern B is used. Similarly to the cases of the scan pattern A, the corrected scan images BL2 and BR2 respectively include additional regions ABL and ABR. Each of the additional regions ABL and ABR includes additional pixels. The additional region ABL is added to and positioned outside of the left-side original image BIL and the blank space WBL. The additional region ABR is added to and positioned outside of the left-side original image BIR and the blank space WBR. The CPU 410 generates a mask image (not shown) for identifying and distinguishing the additional region ABL from other regions (ABL and WBL) and stores the mask image in the buffer region 421. The CPU 410 generates a mask image (not shown) for identifying and distinguishing the additional region ABR from other regions (ABR and WBR) and stores the mask image in the buffer region 421.

In the description below, the corrected scan images AL2, AR2, BL2, and BR2 is simply referred to as AL2, AR2, BL2, and BR2, respectively. Further, the left-side scan data that represents the corrected scan image AL2 or BL2, and the right-side scan data that represents the corrected scan image AR2 or BR2 is simply referred to as left-side scan data and right-side scan data, respectively.

After the tilt correction process is finished, in S35 of FIG. 2, the CPU 410 starts a pre-arrangement process. The pre-arrangement process is a process for selecting an appropriate arrangement position determination process in accordance with the scan pattern before generation of an arranged image, and executing the selected arrangement position determination process in order to determine the relative arrangement position between the left-side original image (AIL or BIL) and right-side original image (AIR or BIR).

FIG. 8 is a flowchart illustrating the pre-arrangement process. In S205, the CPPU 410 performs a blank-space amount determination process on the left-side scan image (AL2 or BL2). In S210, the CPU 410 performs a blank-space amount determination process on the right-side scan image (AR2 or BR2). The blank-space amount determination processes determine whether the amount of blank space on a side of a predetermined direction in the scan image (the amount of right-side blank space in this embodiment) is greater than or equal to a reference level. In other words, the blank-space amount determination processes determine whether the amount of blank on a prescribed side of the scan image satisfies prescribed criteria. More specifically, the CPU 410 determines, on the basis of predetermined determination conditions, whether the amount of blank space (hereinafter referred to as amount of right-side blank space) between the right end of a target scan image (AL2, AR2, BL2, or BR2 shown in FIGS. 5(B) and 7(B)) and the right end of the original image (AIL, AIR, BIL or BIR) in the target scan image is greater than or equal to the reference level. The blank-space amount determination processes will be detailed later.

In S215, the CPU 410 determines whether both of the amounts of the right-side blank spaces are determined to be greater than or equal to the reference level. If a positive determination is made in S215 (S215: YES), in S220 the CPU 410 performs a first arrangement position determination process. For example, when the two target scan images are the scan images AL2 and AR2 of FIG. 5(B) that are generated by the scan pattern A, each of the two scan images includes relatively large blank space (WAL or WAR)

between the right end of the scan image (AL2 or AR2) and the right end of the corresponding original image (AIL or AIR). In this case, the first arrangement position determination process is performed. The first arrangement position determination process is a process for determining the relative position between the two original images by using a first arrangement method that is used to determine a first type arrangement position. The first-type arrangement position is the relative position between the left-side original image and right-side original image that do not overlap with each other.

If at least one of the two scan images has an amount of right-side blank space less than the reference level (S215: NO), in S225 the CPU 410 performs a second arrangement position determination process. For example, when two target scan images are the scan images BL2 and BR2 shown in FIG. 7(B) that are generated by the scan pattern B, each of the scan images includes almost no blank space between the right end of the scan image (BL2 or BR2) and the right end of the corresponding original image (BIL or BIR). In this case, the second arrangement position determination process is performed. The second arrangement position determination process is a process for determining the relative position between the two original images by using a second arrangement method that is used to determine a second type arrangement position. The second-type arrangement position is a relative position in which a part of an area neighboring the right end portion of the left-side original image overlaps with a part of an area neighboring the left end portion of the right-side original image. The first and second arrangement position determination processes will be detailed later.

After the pre-arrangement process is finished, in S40 of FIG. 2, the CPU 410 performs an arranged image generation process. The arranged image generation process generates arranged image data. The arranged image data represents an arranged image where the left-side original image (AIL or BIL) and the right-side original image (AIR or BIR) have been arranged using of the right-side scan data and left-side scan data. In the arranged image, the right-side original image and the left-side original image are arranged in the relative position determined by the first or second arrangement position determination process.

Figure 9A:
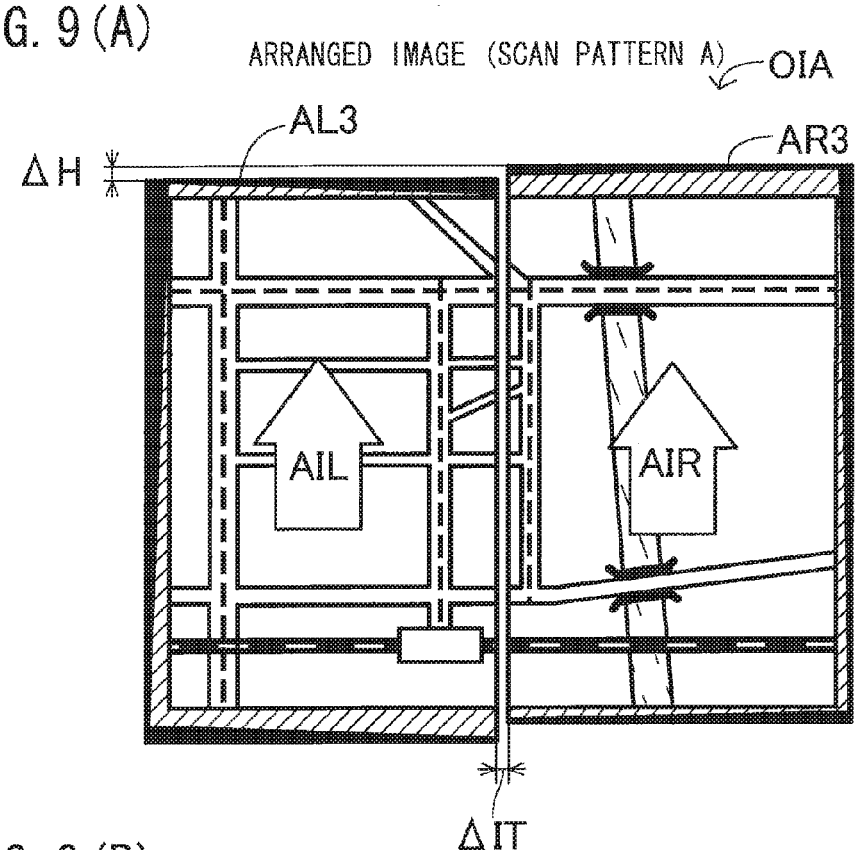
FIG. 9(A) is an explanatory diagram illustrating an arranged image according to the scan pattern A.
Figure 9B:
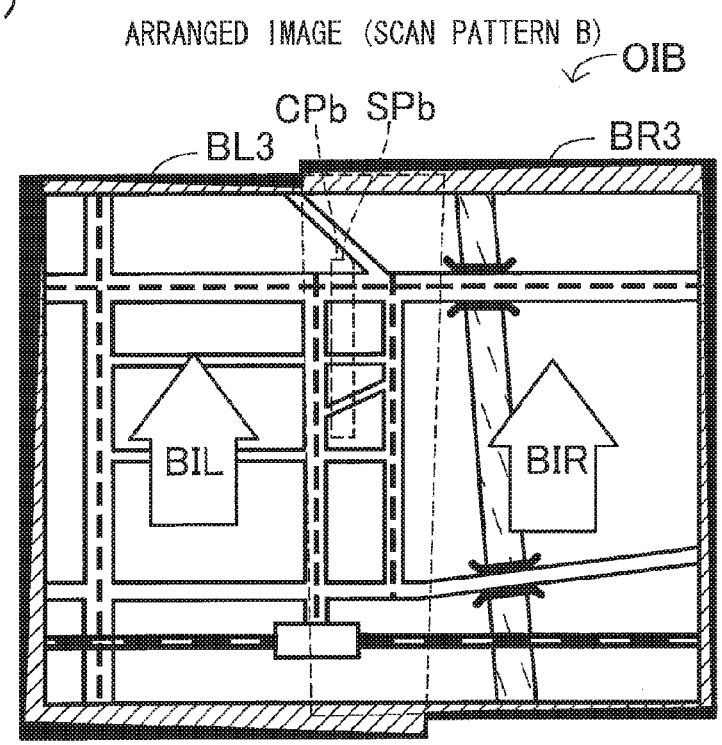
FIG. 9(B) is an explanatory diagram illustrating an arranged image according to the scan pattern B.

FIGS. 9(A) and 9(B) are explanatory diagrams illustrating examples of the arranged images. An arranged image OIA shown in FIG. 9(A) is generated when the two target scan images are the scan images AL2 and AR2 generated according to the scan pattern A. In the arranged image OIA, the original images AIL and AIR are disposed according to the first-type arrangement position.

In the arranged image OIA, the left-side original image AIL and the right-side original image AIR are arranged so as not to overlap with each other. A predetermined position is a relative position between the left-side original image AIL and the right-side original image AIR in the horizontal direction. The predetermined position specifies the relative position in the horizontal direction where the two original images AIL and AIR are arranged with a specific gap ΔIT between the right end of the original image AIL and the left end of the original image AIR. The specific gap ΔIT is equal to the width ΔW of restoration regions AL and AR, which will be described later. For example, a size of the specific gap ΔIT is equal to three pixels. A relative position in the vertical direction between the original images AIL and AIR is set to a position at which the original images AIL and AIR can appropriately represent the original 10. For example, in the arranged image OIA shown in FIG. 9(A), the upper end of the left-side original image AIL is apart from the upper end of the right-side original image AIL by a distance AH in the vertical direction.

For example, the values of pixels in the gap ΔIT are a fixed value representing white. The width of the gap ΔIT is relatively short (e.g. three pixels). Therefore, even if the gap ΔIT is white, the gap ΔIT does not excessively stand out in the arranged image OIA. Especially when the arranged image OIA is printed, a blurring of coloring material will occur. Therefore, the gap ΔIT does not stand out in the printed arranged image OIA. The two original images AIL and AIR are disposed with the specific gap ΔIT because, according to the scan pattern A, a very narrow band-like image on the line VL of the original 10 does not appear in the two original images AIL and AIR, and that the image on the line VL is missing. In view of such circumstances, it is appropriate to provide the gap ΔIT equivalent to the width of the missing band-like image in the arranged image.

The right-side original image AIR is rotated 180 degrees from the state arranged in the right-side scan image AR2 shown in FIG. 5(B). Subsequently, the images AIL and AIR are arranged in the arranged image OIA so that the upward direction of the right-side original image AIR coincides with the upward direction of the left-side original image AIL. As a result, after the amounts of blank space have determined, the right ends of the two original images AIL and AIR shown in FIG. 5(B) are disposed in the central portion of the arranged image OIA in the horizontal direction. Parts of the blank spaces WAL and WAR and parts of the additional regions AAL and AAR that are located on the right sides of the right ends of the original images AIL and AIR in the scan images AL2 and AR2 shown in FIG. 5(B) are not disposed on the arranged image OIA.

An arranged image OIB shown in FIG. 9(B) is generated when the two target scan images are the scan images BL2 and BR2 generated according to the scan pattern B. In the arranged image OIB, the original images BIL and BIR are disposed according to the second-type arrangement position.

In the arranged image OIB, the left-side original image BIL and the right-side original image BIR are disposed so as to partially overlap with each other. In the arranged image OIB, the left-side original image BIL and the right-side original image BIR are disposed so that a reference region SPb overlaps with a similar region CPb, as described later.

In the arranged image OIB, values (i.e. RGB values) of pixels inside a region where the left-side original image BIL overlaps with the right-side original image BIR are preferentially adopted to values of pixels in the right-side original image BIR (i.e. the right-side scan image BR2).

The right-side original image BIR is rotated 180 degrees from the state arranged in the right-side scan image BR2 shown in FIG. 7(B). Subsequently, the images BIL and BIR are arranged in the arranged image OIB so that the upward direction of the right-side original image BIR coincides with the upward direction of the left-side original image BIL. As a result, the right ends of the two original images BIL and BIR shown in FIG. 7(B) are disposed in the central portion of the arranged image OIB in the horizontal direction. Parts of the additional regions ABL and ABR on the right sides of the right ends of the original images BIL and BIR in the scan images BL2 and BR2 shown in FIG. 7(B) are not disposed on the arranged image OIB.

In the arranged image generation process, the arranged image data is generated so as to represent one arranged image that shows the original 10 shown FIG. 3 by using the two original images. The CPU 410 converts the generated arranged image data into an image file of a prescribed format, and thereby generates an arranged image file representing the arranged image. For example, the arranged image data, which is RGB image data, is compressed in JPEG, and the arranged image file is generated in JPEG format.

In S45 of FIG. 2, the CPU 410 transmits the generated arranged image file to the multifunction peripheral 200. The CPU 210 of the multifunction peripheral 200 receives the arranged image file, and stores the received arranged image file in the nonvolatile storage device 230, and notifies the user that the arranged image file has been received. In this manner, the arranged image file becomes available to the user. For example, in response to a command from the user, the multifunction peripheral 200 prints the arranged image OIA or OIB by using the arranged image file.

According to the embodiment, the CPU 410 determines whether the amount of blank space on the right side of the left-side scan image (AL1 or BL1) is greater than or equal to the reference level (S205 of FIG. 8). An arrangement method to be used is selected depending on the result of this determination (S215 to S225). As a result, an appropriate image arrangement method can be selected when generating arranged image data representing the arranged image (OIA or OIB) in which the left original image (AIL or BIL) and the right original image (AIR or BIR). A condition that there are a relatively large number of specific-color pixels (specifically, white pixels) between the right end of the left-side original image (AIL or BIL) and the right end of the left-side scan image is used as the determination condition for determining whether the amount of blank space on the right side is greater than or equal to the reference level.

According to the embodiment, the CPU 410 determines whether the amount of blank space on the right side of the right-side scan image (AR1 or BR1) is greater than or equal to a reference level (S210). The arrangement method is selected (S215 to S225) depending on the result of the determination with respect to the right-side scan image (S210) as well as the determination with respect to the left-side scan image (S205).

More specifically, when the amount of blank space on the right side of the left-side scan image is greater than or equal to the reference level and when the amount of blank space on the right side of the right-side scan image is greater than or equal to the reference level (S215: YES), the first arrangement position determination process is performed (S220). This is because it is estimated that the scan pattern A has been used in this case. On the other hand, when the amount of blank space on the right side of the left-side scan image is less than the reference level and when the amount of blank space on the right side of the right-side scan image is less than the reference level (S215: NO), the second arrangement position determination process is performed (S225). This is because it is estimated that the scan pattern B has been used in this case. Accordingly, the arrangement method suitable for the scan pattern can be appropriately selected.

The first arrangement method is a method for determining the first-type arrangement position where the left-side original image and the right-side original image do not overlap. The second arrangement method is a method for determining the arrangement position where the left-side original image and the right-side original image partially overlap. Accordingly, the two type methods can be appropriately determined. If the scan pattern A is used, as shown in FIGS. 4(A)-4(C) the original images AIL and AIR are obtained by reading both sides of the half-folded original 10. Accordingly, as shown in FIG. 5(B), there is no region of the original 10 that appears in both the original images AIL and AIR. Therefore, it is appropriate that the left-side original image AIL and the right-side original image AIR are arranged in the arranged image so as not to overlap with each other. If the scan pattern B is used, as shown in FIGS. 6(A) and 6(B) the original images BIL and BIR are obtained by reading the original 10 that is not folded. Accordingly, as shown in FIG. 7(B) the images CIL and CIR showing the central portion CA of the original 10 appears respectively in the original images BIL and BIR. Therefore, it is appropriate that the left-side original image BIL and the right-side original image BIR are arranged in the arranged image so that a region neighboring the right end of the left-side original image BIL overlaps with a region neighboring the left end of the right-side original image BIR that has been rotated 180 degrees from a state shown in FIG. 7(B).

If the amount of blank space on the left-side scan image is greater than or equal to the reference level while the amount of blank space on the right-side scan image is less than the reference level, or if the amount of blank space on the left-side scan image is less than the reference level while the amount of blank space on the right-side scan image is greater than or equal to the reference level, a scan pattern used for generating original images cannot be determined. In this case (S215 of FIG. 8: NO), the CPU 410 performs the second arrangement position determination process (S225). This case is considered to rarely occur. The first embodiment is different from second and third embodiments described below in that one arrangement method is selected even if it is unclear whether the scan pattern A or B has been used.

A-3. Blank-Space Amount Determination Process

The blank-space amount determination process for the right-side scan image (AR2 or BR2) in S205, and the blank-space amount determination process for the left-side scan image (AL2 or BL2) in S210 will be explained. The two processes are the same except that the two processes target different scan images. Accordingly, two processes are explained together.

Figure 10:
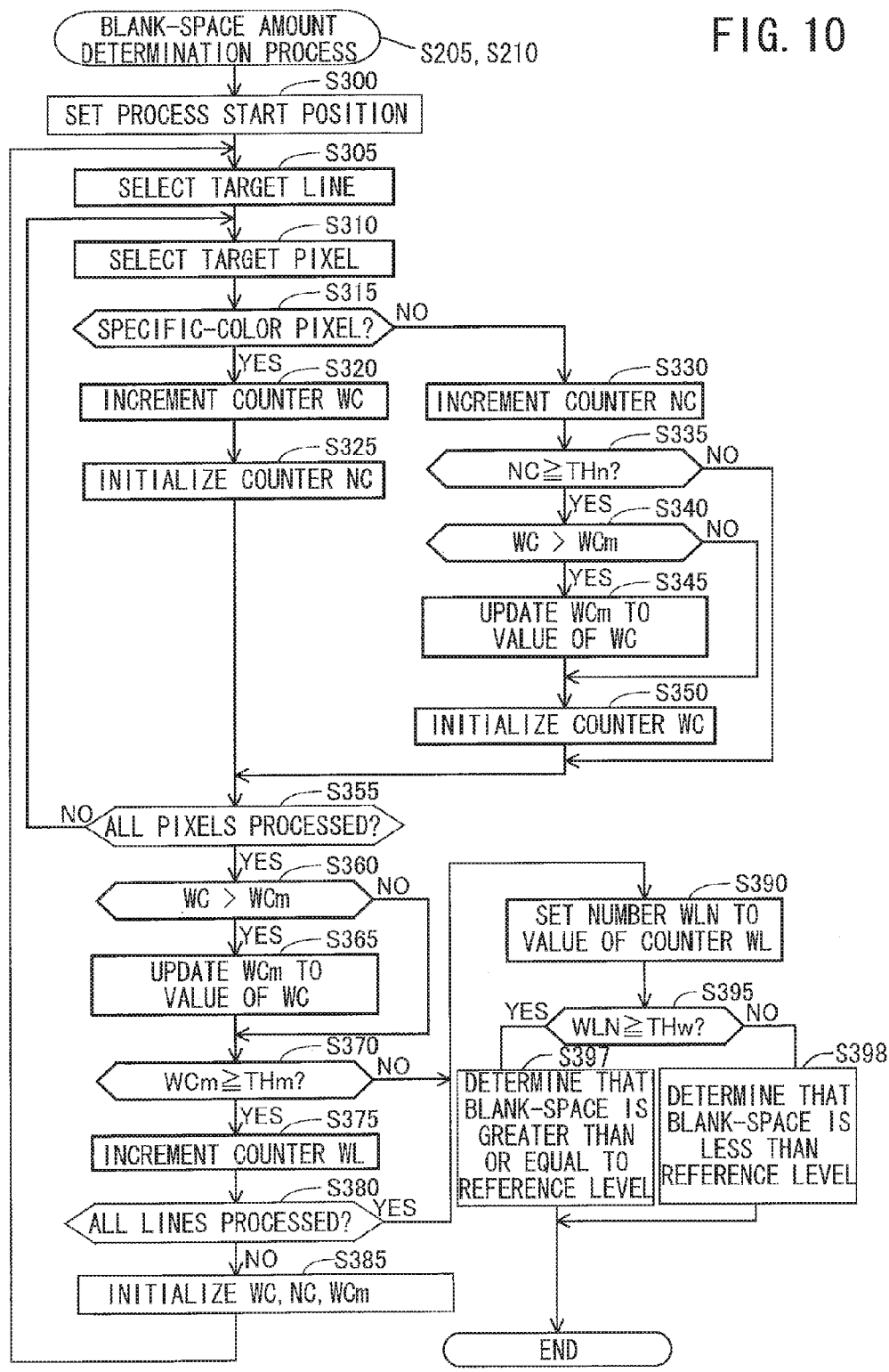
FIG. 10 is a flowchart illustrating a blank-space amount determination process according to the first embodiment.

FIG. 10 is a flowchart illustrating the blank-space amount determination process. In S300, the CPU 410 determines a process start position STP. The process start position STP is a specific position in the horizontal direction of the target tilt-corrected scan image. The process start position STP is set to a position neighboring an end of an image that should be disposed in a central portion of the arranged image in the horizontal direction (referred to as a center arrangement end). In the embodiment, the position STP is set adjacent to the right end of the scan image AL2, AR2, BL2, or BR2 (FIGS. 5(B) and 7(B)). As shown in FIG. 5(A), the scan image (AL1 or AR1) before the tilt correction includes a upper right vertex and a lower right vertex. In the scan image (AL1 or AR1) before the tilt correction, these right vertices coincide with corners of the blank space (WAL and WAR). As shown in FIG. 5(B), after the tilt correction is performed, these right vertices are moved to vertices (hereinafter referred to as "moved right vertices") of a rectangular region surrounded by the additional region (AAL or AAR). So, the mover right vertices are corners of the rotated blank space (WAL or WAR). In other words, these two moved right vertices correspond to the upper right vertex and the lower right vertex of the pre-tilt correction scan image shown in FIG. 5(A). One of the two moved right vertices that is positioned furthest from the right end of the tilt corrected scan image shown in FIG. 5(B) is selected. The process start position STP is set to a position of the selected vertex in the horizontal direction. For example, a moved vertex (or a right end corner of WAL) in the tilt-corrected scan image AL2 corresponding to the lower right vertex of the right-side scan image AL1 (FIG. 5(A)) is selected. Similarly, as shown in FIG. 7(A), the scan image (BL1 or BR1) before the tilt correction includes a upper right vertex and a lower right vertex. In the scan image (BL1 or BR1) before the tilt correction, these right vertices coincide with corners of the blank space (WBL and WBR). As shown in FIG. 7(B), after the tilt correction is performed, these right vertices are moved to vertices (hereinafter referred to as "moved right vertices") of a rectangular region surrounded by the additional region (ABL or ABR). That is, the mover right vertices are corners of the rotated blank space (WBL or WBR). One of the two moved right vertices that is positioned furthest from the right end of the tilt corrected scan image shown in FIG. 7(B) is selected. The process start position STP is set to a position of the selected vertex in the horizontal direction.

In S305 the CPU 410 selects a target line from among a plurality of pixel lines in the tilt corrected scan image. Each of the plurality of pixel lines extends in the vertical direction in the scan image. Each of the plurality of pixel lines has a plurality of pixels that is arranged in the vertical direction and positioned at the same position in the horizontal direction. The CPU 410 firstly selects a pixel line at the process start position STP. The target line is sequentially selected from the process start position STP toward a direction so as to go away from the right end of the tilt corrected scan image, that is, to a leftward direction.

In S310, the CPU 410 selects a target pixel from a plurality of pixels in the target line. The target pixel is selected one by one from the upper end of the target line to the lower end thereof.

In S315, the CPU 410 determines whether the target pixel is a specific-color pixel representing a specific color that the blank space should have. The specific color is the color of the document table 255. In this embodiment, the specific color is white. If the target pixel has a pixel value (RGB value) that is within a prescribed range representing the specific color, the CPU 410 judges that the target pixel is the specific-color pixel. If the target pixel has a pixel value that is outside the range representing the specific color, the CPU 410 judges that the target pixel is a non-specific-color pixel having a color different from the specific color.

If the target pixel is the specific-color pixel (S315: YES), in S320 the CPU 410 increments pixel counter WC by one. The pixel counter WC is a counter for counting the number of specific-color pixels that continuously appear in the vertical direction. In S325, the CPU 410 initializes noise counter NC, or sets the noise counter NC to an initial value "0". The noise counter NC is a counter for counting the number of non-specific-color pixels that continuously appear in the vertical direction.

If the target pixel is the non-specific-color pixel (S315: NO), in S330 the CPU 410 increments the noise counter NC by one. In S335, the CPU 410 determines whether the noise counter NC is greater than or equal to a prescribed threshold value THn. For example, the threshold value THn is between two and five.

If the noise counter NC is greater than or equal to the prescribed threshold value THn (S335: YES), in S340 the CPU 410 determines whether the current pixel counter WC is greater than a current maximum consecutive number WCm. If the pixel counter WC is greater than the maximum consecutive number WCm (S340: YES), in S345 the CPU 410 updates the maximum consecutive number WCm to the current value of the pixel counter WC, and moves to S350.

If the pixel counter WC is less than or equal to the maximum consecutive number WCm (S340: NO), the CPU 410 skips S345 and proceeds to S350. In S350, the CPU 410 initializes the value of the pixel counter WC.

If the noise counter NC is less than the prescribed threshold value THn (S335: NO), the CPU 410 skips the process S340-350, and moves to S355.

In S355, the CPU 410 determines whether all the pixels in the target line have been processed as the target pixel. If there is an unprocessed pixel (S355: NO), the CPU 410 returns to S310, and the CPU 410 selects an unprocessed pixel as the target pixel. If all the pixels have been processed (S355: YES), in S360 and S365 the CPU 410 performs the same processes as those of S340 and S345, which are described above. That is, in S360 the CPU 410 determines whether the current pixel counter WC is greater than the current maximum consecutive number WCm. If the pixel counter WC is greater than the maximum consecutive number WCm (S360: YES), in S365 the CPU 410 updates the maximum consecutive number WCm to the current value of the pixel counter WC. If the pixel counter WC is less than or equal to the maximum consecutive number WCm (S360: NO), the CPU 410 skips S365 and proceeds to S370.

At the time when the process has reached S370, the maximum consecutive number WCm indicates the maximum number of specific-color pixels that consecutively arranged in the vertical direction in the target line. As is clear from the above explanation (especially, the description that the CPU 410 skips S350 while the noise counter NC is less than the threshold value THn), the CPU 410 determines that one pixel of the specific color and another pixel of the specific color are consecutively arranged in the vertical direction, not only when one pixel of the specific color and another pixel of the specific color are actually consecutively arranged in the vertical direction, but also when there is the number of non-specific-color pixels less than the threshold value THn between one pixel of the specific color and another pixel of the specific color. This is because a non-specific-color pixel may be included as noise in the blank space of the scan image due to various reasons, such as characteristics of an image sensor of the scanning unit 250 or stains on the document table 255. An consecutive condition is a condition for determining whether one pixel of the specific color and another pixel of the specific color are consecutively arranged in the vertical direction in the target line. In the embodiment, the consecutive condition is that the number of non-specific color pixels larger than or equal to the threshold value THn does not exist between one pixel of the specific color and another pixel of the specific color in the target line. The consecutive condition may be that pixels of the specific color actually arranged in the vertical direction in the target line.

In S370, the CPU 410 determines whether the maximum consecutive number WCm is greater than or equal to the threshold value THm. For example, the threshold value THm is set at 50% of the number of pixels in the vertical direction of the target scan image. If the maximum consecutive number WCm is greater than or equal to the threshold value THm, the CPU 410 determines that the target line is a blank-space line that constitutes the blank space. That is, if the maximum consecutive number WCm is greater than or equal to the threshold value THm (S370: YES), in S375 the CPU 410 increments the blank-space counter WL by one. The blank-space counter WL is used to count the number of blank-space lines.

If the maximum consecutive number WCm is less than the threshold value THm, it can be determined that the target line is a line that constitutes part of the right end of the original image, but not a blank-space line that constitutes the blank space. That is, if the maximum consecutive number WCm is less than the threshold value THm (S370: NO), in S390 the CPU 410 sets blank-space line number WLN of the target scan image to the current value of the blank-space counter WL, and proceeds to S395. The blank-space line number WLN is an index value indicating the length of the right-side blank space of the scan image in the horizontal direction.

In S380, the CPU 410 determines whether all lines inside the target scan image have been processed as the target line. At the time when the target line has reached the right end of the original image, the blank-space amount determination process normally end via the process S390. Accordingly, it does not occur that all the lines have been processed except irregular cases where the target scan image does not include an original image, for example. If there is an unprocessed line in the scan image (S380: NO), in S385 the CPU 410 initializes the pixel counter WC, the noise counter NC, and the maximum consecutive number WCm, returns to S305, and selects a line abutting on the left side of the current target line as a next target line. If all the lines inside the scan image have been processed (S380: YES), in S390 the CPU 410 sets the blank-space line number WLN of the target scan image to the current value of the blank-space counter WL, and moves to S395.

In S395, the CPU 410 determines whether the blank-space line number WLN is greater than or equal to a threshold value THw. If the blank-space line number WLN is greater than or equal to the threshold value THw (S395: YES), in S397 the CPU 410 determines that the amount of blank space in the target scan image is greater than or equal to the reference level. The CPU 410 then ends the blank-space amount determination process. If the blank-space line number WLN is less than the threshold value THw (S395: NO), in S398 the CPU 410 determines that the amount of blank space in the target scan image is less than the reference level. The CPU 410 then ends the blank-space amount determination process. The threshold value THw is 20, for example, when the resolution is 300 dpi in the horizontal direction of the target scan image.

According to the blank-space amount determination process described above, the CPU 410 judges, as a specific-color pixel, a pixel whose value satisfies a specific determination condition (S315). Specifically, a pixel having a value satisfying the specific determination condition is a pixel having a value within a prescribed range specifying a specific color. The CPU 410 then calculates the number of specific-color pixels satisfying a consecutive condition indicating that specific-color pixels are consecutively arranged in the vertical direction (S320 to S365). That is, the CPU 410 calculates the maximum consecutive number WCm. Then, the CPU 410 uses the maximum consecutive number WCm to determine whether the amount of blank space is greater than or equal to the reference level (S370 to S398). As a result, the CPU 410 can appropriately determine whether the amount of blank space is greater than or equal to the reference level. This is because the blank space includes consecutive specific-color pixels.

Furthermore, the consecutive condition is that the number of non-specific-color pixel greater than or equal to the threshold value THn does not exist between one pixel of the specific color and another pixel of the specific color. According to this condition, noise in the blank space is taken into account, and the appropriate maximum consecutive number WCm can be calculated. Thus, the CPU 410 can appropriately determine whether the amount of blank space is greater than or equal to the reference level.

When the CPU 410 calculates the blank-space line number WLN indicating the number of blank-space lines between the right end of the scan image and the right end of the original image inside the tilt corrected scan image through the processes S370-S390. Here, the CPU determines 410 that the target line is the blank-space line from among the plurality of lines when the maximum consecutive number WCm of the target line is greater than or equal to the threshold value THm. The CPU 410 can determine whether the amount of blank space is greater than or equal to the reference level by using the blank-space line number WLN. As a result, the CPU can determine whether the amount of blank space is greater than or equal to the reference level more accurately. This is because the amount of blank space greater than or equal to the reference level in the right portion of the scan image includes a plurality of lines that is located between the right end of the original image and the right end of the scan image and that includes a relatively large number of specific-color pixels continuously arranged in the vertical direction.

The CPU 410 determines whether each line is a blank-space line from the process start position STP (FIGS. 5(B) and 7(B)) as a specific position neighboring the right end of the target scan image, in the direction (or leftward direction) opposite to a direction toward the right-end (or rightward direction) (S300-S385). The CPU 410 calculates the number of blank-space lines that continuously arranged in the horizontal direction as blank-space line number WLN (S375, S380, and S390). In this manner, the blank-space number WLN can be appropriately calculated. This is because a plurality of blank-space lines constituting the right-side blank space of the scan image arranged continuously in the horizontal direction from an area neighboring the right end of the scan image to the right end of the original image.

The CPU 410 determines whether the amount of blank space is greater than or equal to the reference level on the basis of a determination condition that the blank-space line number WLN is greater than or equal to the threshold value THw. Here, the blank-space line includes relatively large number of specific color pixels consecutively arranged in the vertical direction and the blank-space line number WLN indicates the number of the blank lines continuously arranged in the horizontal direction. This determination condition indicates that there is a relatively number of specific color pixels that is located between the right end of the original image and the right end of the scan image, that is arranged consecutively in the vertical direction and the horizontal direction, and that is not included in the original image, and that is included in the scan image.

A-4. First Arrangement Position Determination Process

Figure 11:
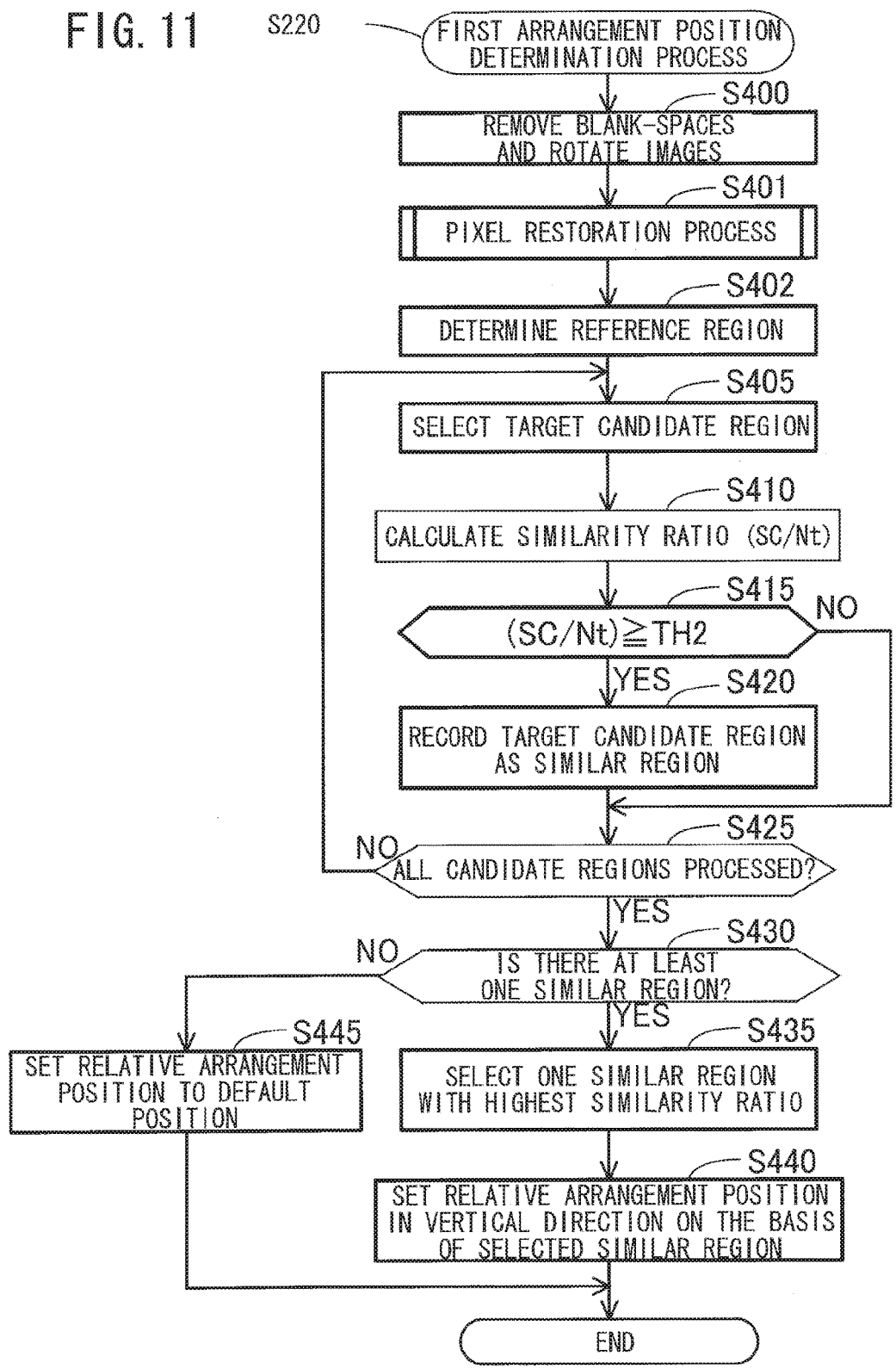
FIG. 11 is a flowchart illustrating a first arrangement position determination process according to the first embodiment.
Figure 12:
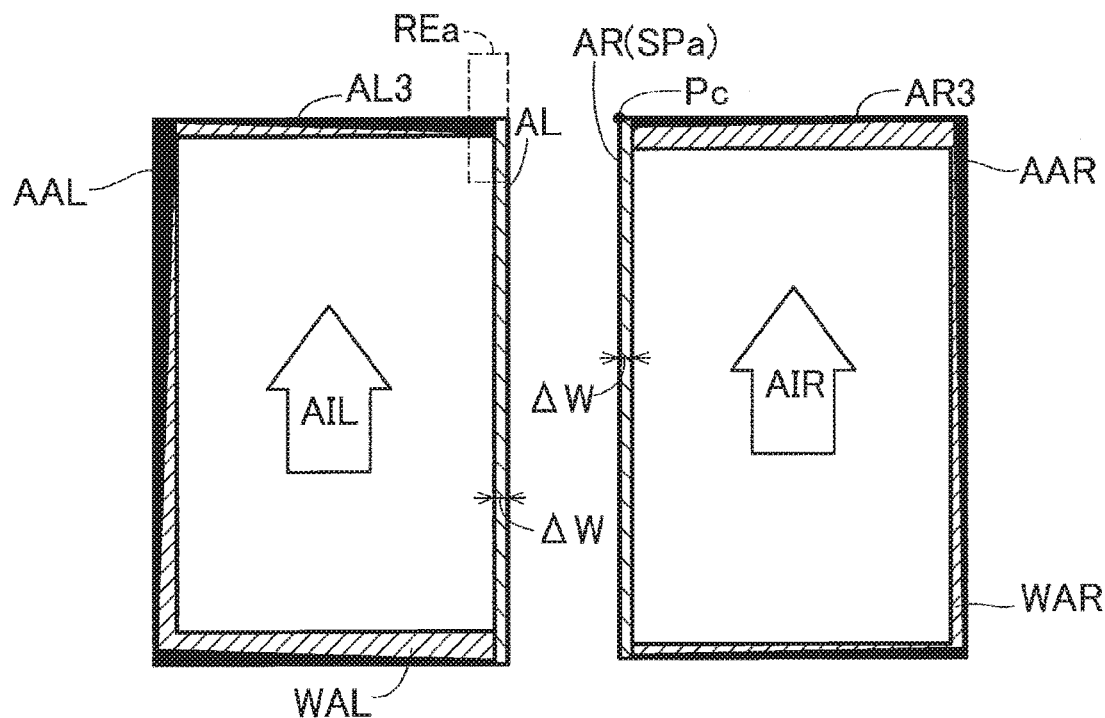
FIG. 12(A) is an explanatory diagram illustrating the first arrangement position determination process shown in FIG. 11.
FIG. 12(B) is an explanatory diagram illustrating a relative position set in the first arrangement position determination process shown in FIG. 11.
Figure 12:
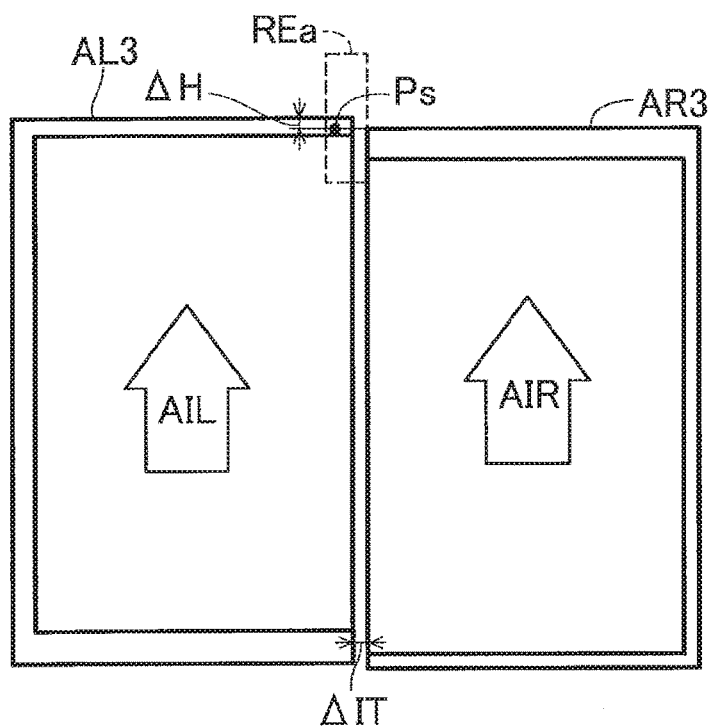

The first arrangement position determination process of S220 (FIG. 8) will be described. FIG. 11 is a flowchart illustrating the first arrangement position determination process. FIGS. 12(A) and 12(B) are explanatory diagrams illustrating the first arrangement position determination process. The first arrangement position determination process is executed when the scan pattern A is used. The description below will focus on the case where the scan images AL2 and AR2 shown in FIG. 5(B) are to be processed as an example.

In S400, the CPU 410 performs blank-space removal and rotation of the scan images AL2 and AR2. More specifically, the CPU 410 removes, from the scan images AL2 and AR2, a line that is determined to be a blank-space line by the blank-space amount determination process, as well as a portion on the right side of the blank lines (or a portion on the right side of the process start position STP). The CPU 410 rotates the right-side scan image AR2 180 degrees so that the upward direction of the right-side original image AIR in the right-side scan image AR2 coincides with the upward direction of the left-side original image AIL in the left-side scan image AL2.

FIG. 12(A) shows scan images AL3 and AR3 after the process S400. FIG. 12(A) does not show the inner portions of the original images AIL and AIR, and only shows arrows with reference symbols. The left-side scan image AL3 does not include the right-side blank space, while the right-side scan image AR3 rotated 180 degrees does not include the left-side blank space. It is required in a pixel restoration process S401 to identify the right end of the left-side original image AIL in the left-side scan image AL3 and the left end of the right-side original image AIR in the right-side scan image AR3. For the purpose of performing S401, in 400 the CPU 410 only has to identify the right end of the left-side original image AIL in the right end of the left-side original image AIL in the left-side scan image AL3 and the left end of the right-side original image AIR in the right-side scan image AR3. So, in S400, the removal of the blank spaces may not be performed.

In S401, the CPU 410 performs the pixel restoration process to restore pixels missing in the original images AIL and AIR in the scan images AL3 and AR3. FIG. 12(A) shows the scan images AL3 and AR3, and restoration regions AL and AR. A plurality of pixels is restored in the restoration regions in the pixel restoration process. The scan images AL3 and AR3 are generated by reading the half-folded original 10 according to the scan pattern A. Accordingly, an image in a very narrow linear area located on the line VL of the original 10 appears neither in the original image AIL in the scan image AL3 nor the original image AIR in the scan image AR3. That is, the image in this narrow linear area is missing in the scan images AL3 and AR3. The restoration regions AL and AR shown FIG. 12(A) correspond to the very narrow linear area located on the line VL of the original 10.

As shown in FIG. 12(A), the left-side restoration region AL is located along an end of the left-side original image AIL (or along the right end of the left-side original image AIL) and outside the left-side original image AIL. Here, this end of the left-side original image AIL corresponds to the line VL. The left-side restoration region AL is a very narrow linear region that extends along the entire length of the right end of the original image AIL from upper end to lower end. The right-side restoration region AR is located along an end of the right-side original image AIR (or along the left end of the right-side original image AIR) and outside the right-side original image AIR. Here, this end of the right-side original image AIR corresponds to the line VL. The right-side restoration region AR is a very narrow linear region that extends along the entire length of the left end of the original image AIR from upper end to lower end. A prescribed value determined in advance by experiments is used as widths ΔW in the horizontal direction in FIG. 12(A), that is, widths of the restoration regions AL and AR in a direction perpendicular to ends of the restoration regions AL and AR. These ends of the restoration regions AL and AR corresponds to the line VL. In the embodiment, each of the widths ΔW is set at three pixels when the resolution of the original images AIL and AIR is 300 dpi in the horizontal direction.

Figure 13:
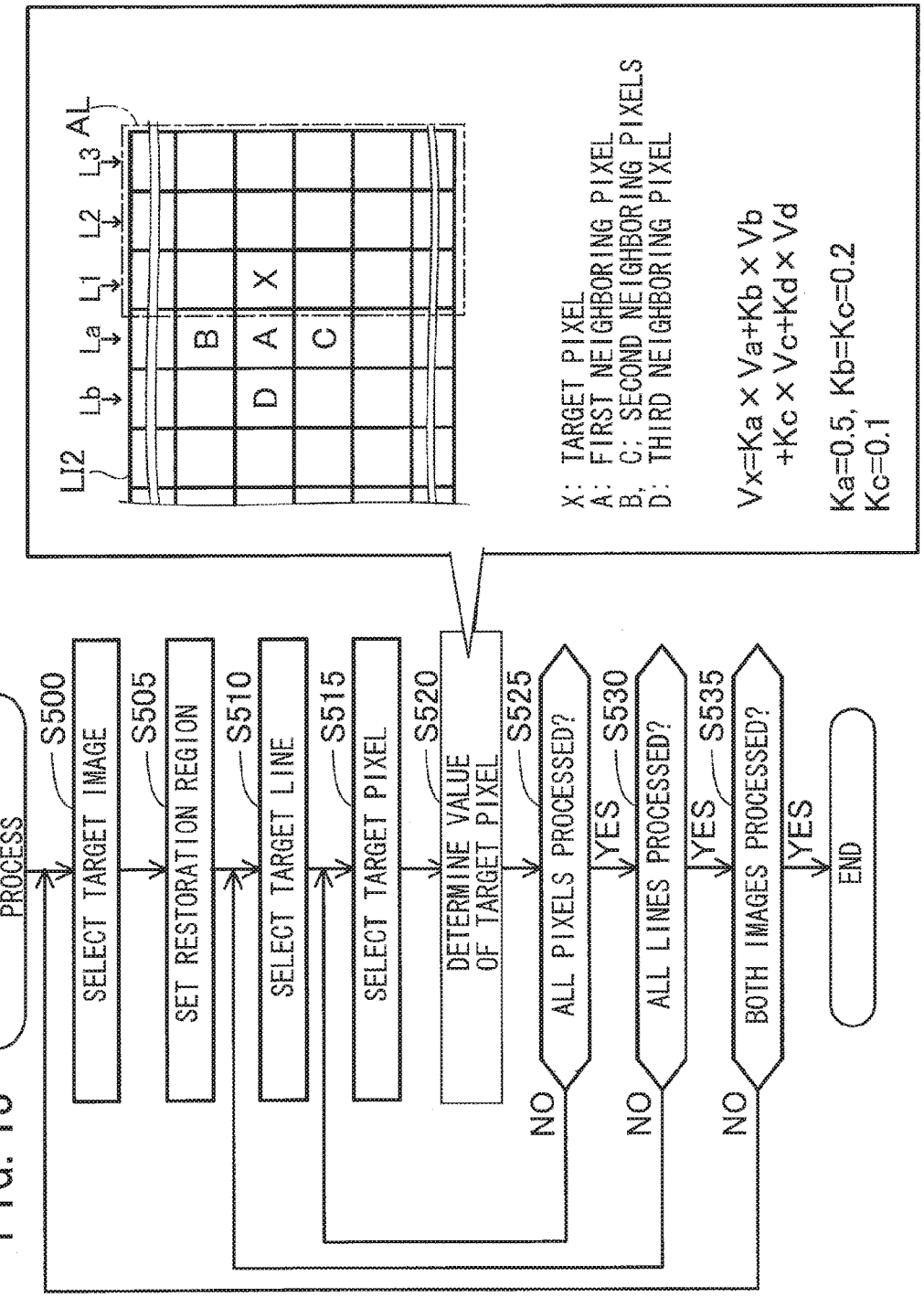
FIG. 13 is a flowchart illustrating a pixel restoration process according to the first embodiment.

FIG. 13 is a flowchart for illustrating the pixel restoration process. In S500, the CPU 410 selects a target image from the left-side original image AIL and the right-side original image AIR. In S505, the CPU 410 sets the above-described restoration region on the target image. For example, if the left-side original image AIL is a target image, the left-side restoration region AL is set along the right end of the left-side original image AIL.

In S510, the CPU 410 selects a target line in the restoration region. In the embodiment, the width ΔW of the restoration region in the horizontal direction is three pixels. That is, the restoration region has three pixel lines. Each line extends in the top-to-bottom direction. The CPU 410 sequentially selects one target line out of the three pixel lines from the side close to the target image. For example, as shown in the right section of FIG. 13, the left-side restoration region AL has three lines L1 to L3. If the left-side original image AIL is a target image, the CPU 410 first selects the line L1 as a target line, secondly the line L2 as a target line, and finally the line L3 as a target line.

In S515, the CPU 410 selects one target pixel from among a plurality of pixels included in the target line. For example, the CPU 410 sequentially selects, from top to bottom, a target pixel from among a plurality of pixels included in the target line.

In S520, the CPU 410 determines a value of the target pixel (or RGB value in the embodiment) by using values of a plurality of pixels neighboring the target pixel. If the left-side original image AIL is a target image, the value of a target pixel is determined on the basis of values of four neighboring pixels that are located on the left side of the target pixel. For example, if a pixel X on the line L1 shown in the right section of FIG. 13 is a target pixel, the four neighboring pixels are three pixels A, B, and C on a neighboring line La that is on the left side of the line L1, and one pixel D on a neighboring line Lb that is on the left side of the line La. The pixel A is a first neighboring pixel that is closest to the target pixel among the pixels located on the left side of the target pixel. The pixels B and C are second neighboring pixels that are the second closest to the target pixel. The pixel D is a third neighboring pixel that is the third closest to the target pixel. A specific component value (e.g., R-component value) Vx of the pixel X is calculated by the following equation (1) with the use of specific component values Va to Vd. The specific component values Va to Vd are component values of the pixels A to D, respectively.

$$Vx = Ka \times Va + Kb \times Vb + Kc \times Vc + Kd \times Vd \quad (1)$$

Each of values Ka-Kd are coefficients that are determined in advance on the basis of the corresponding distance between the pixel X and the corresponding one of the pixels A-D. Specifically, the coefficients Ka to Kd are determined so that the sum of the coefficients Ka-Kd is 1 and so that the shorter the corresponding distance from the pixel X, the larger values the coefficients Ka-Kd have. In the embodiment, Ka=0.5, Kb=Kc=0.2, and Kd=0.1.

The CPU 410 uses the equation (1) to calculate three component values of the target pixel. In this manner, the RGB values of the target pixel are determined.

Although not shown in the drawings, if the right-side original image AIR is a target image, the values of a target pixel are determined on the basis of the values of four neighboring pixels located on the right side of the target pixel, similarly to the left-side original image AIL.

In S525, the CPU 410 determines whether all pixels on the target line have been processed as the target pixel. If there is an unprocessed pixel (S525: NO), the CPU 410 returns to S515 and then selects an unprocessed pixel as the target pixel. If all the pixels have been processed (S525: YES), in S530 the CPU 410 determines whether all lines in the restoration region set in the target image have been processed as the target line. If there is an unprocessed line (S530: NO), the CPU 410 returns to S510 and selects an unprocessed line as the target line. If all the lines have been processed (S530: YES), the CPU 410 advances to S135.

In S535, the CPU 410 determines whether both the left-side original image AIL and the right-side original image AIR have been processed. If there is an unprocessed original image (S535: NO), the CPU 410 goes back to S500 and selects an unprocessed original image as the target image. If both the original images have been processed (S535: YES), the CPU 410 ends the pixel restoration process.

As described above, for pixels of the left-side restoration region AL, the values of pixels on the line L1 on the right side of the right end of the left-side original image AIL are determined on the basis of the values of a plurality of pixels on the lines La and Lb. Here, the lines La and Lb are along the right end of the left-side original image AIL. A plurality of pixels on the lines La and Lb is located in the left-side original image AIL and arranged along the right end of the left-side original image AIL.

Similarly, in the left-side restoration region AL, the values of pixels on the line L2 on the right side of the line L1 are determined on the basis of the values of a plurality of pixels on the lines L1 and La. In the left-side restoration region AL, the values of pixels on the line L3 on the right side of the line L2 are determined on the basis of the values of a plurality of pixels on the lines L1 and L2. In this manner, the pixel restoration process generates a plurality of pixels in the left-side restoration region AL by directly or indirectly using the values of a plurality of pixels in the lines La and Lb that are along the right end of the left-side original image AIL. A plurality of pixels inside the left-side restoration region AL is not included in the left-side original image AIL. The plurality of pixels inside the left-side restoration region AL is along the right end of the left-side original image AIL, and is arranged on the outer side of the left-side original image AIL (referred to as left-side restoration pixels).

Similarly to the left-side restoration region AL, the image restoration process generates a plurality of pixels inside the right-side restoration region AR by directly or indirectly using the values of a plurality of pixels in lines that are within the right-side original image AIR and along the left end of the right-side original image AIR. A plurality of pixels in the right-side restoration region AR is not included in the right-side original image AIR. The plurality of pixels in the right-side restoration region AR is along the left end of the right-side original image AIR, and is arranged on the outer side of the right-side original image AIR (referred to as right-side restoration pixels).

Both a band-like image consisting of a plurality of left-side restoration pixels in the left-side restoration region AL and a band-like image consisting of a plurality of right-side restoration pixels in the right-side restoration region AR represent a band-like image on the line VL of the original 10. Accordingly, the band-like image in the left-side restoration region AL and the band-like image in the right-side restoration region AR include portions that resemble each other.

The restoration regions AL and AR are regions that are adjacent to the original images AIL and AIR, respectively. However, in the buffer region 421, the image data including the restoration pixels inside the restoration region AL or AR is not necessarily integrated with the image data representing corresponding one of the original image AIL and the original image AIR. The image data including the restoration pixels inside the restoration region AL or AR may be a different from both the image data representing the original image AIL and the image data representing the original image AIR.

After the pixel restoration process is ended, in S402 (FIG. 11) the CPU 410 determines a reference region Spa. The reference region SPa is set so as to include at least part of the right-side restoration region AR. In the embodiment, the entire right-side restoration region AR, that is, the entire image consisting of a plurality of right-side restoration pixels generated by the pixel restoration process, is set as the reference region SPa. Instead, a part of the right-side restoration region AR may set as the reference region SPa. Or, a region that includes the entire right-side restoration region AR and a part of the left end of the right-side original image AIR may be set as the reference region SPa, from an image formed by the right-side restoration region AR and the right-side original image AIR.

Figure 14:
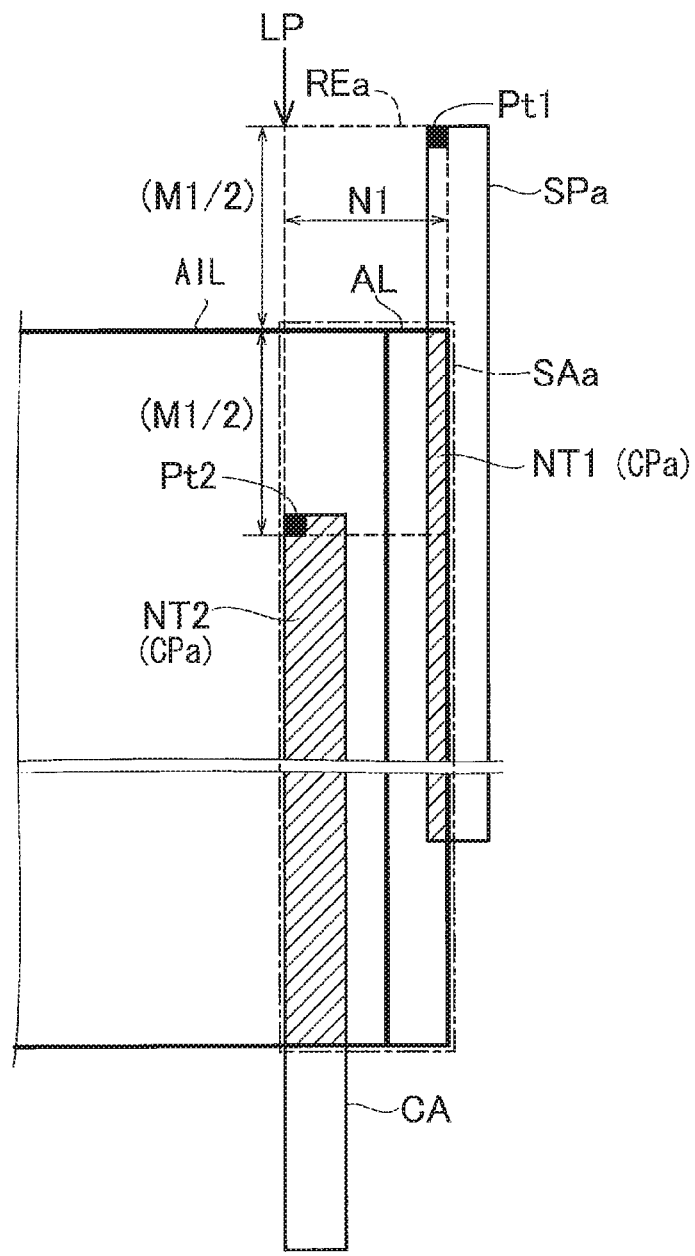
FIG. 14 is an enlarged view of a reference range shown in FIG. 12(A)

In S405, the CPU 410 selects one target candidate region from among a plurality of candidate regions determined on the basis of a predetermined reference range REa. For example, as shown in FIG. 12(A), the reference range REa is a range indicated by a broken line at the upper right portion of the left-side original image AIL. FIG. 14 is an enlarged view of an area near the reference range REa shown in FIG. 12(A). The reference range REa is a rectangular region having M1 pixels (vertical direction)×N1 pixels (horizontal direction) (M1 and N1 are integers greater than or equal to 2). For example, N1 is about 10, and M1 is between tens and hundreds. The right end of the reference range REa matches the right end of the left-side restoration region AL on the right side of the left-side original image AIL. The center of the reference range REa in the vertical direction is at the upper end of the left-side original image AIL.

The CPU 410 selects one target pixel-position from among the positions of (M1×N1) pixels inside the reference range REa. The CPU 410 identifies, as an target candidate region, a region that is inside the left-side original image AIL or the restoration region AL, and that overlaps with the reference region SPa if the reference region SPa is disposed so that a pixel Pc (FIG. 12(A)) is positioned at the target pixel-position. Here, as shown in FIG. 12(A), the pixel Pc is a pixel in the reference region SPa positioned an upper left end thereof. In this manner, the positions of (M1×N1) pixels inside the reference range REa is in one-to-one correspondence with (M1×N1) candidate regions. For example, a hatched candidate region NT1 in FIG. 14 is identified when an upper-right pixel position Pt1 in the reference range REa is set as the target pixel-position. A hatched candidate region NT2 in FIG. 14 is identified when a lower-left pixel position Pt2 in the reference range REa is set as the target pixel-position. As shown in FIG. 14, the reference range REa includes a left end at the position LP. A search region SAa is an area within which a candidate region can be set, and is located on the right side of the position LP. In the embodiment, the search region SAa includes the left-side restoration region AL and a portion of the left-side original image AIL. Here, the portion of the left-side original image AIL abuts to the right end of the left-side original image AIL.

For example, the target candidate region is initially set to the candidate region NT1 in FIG. 14. The CPU 410 moves the target pixel-position in the reference range REa on a pixel-to-pixel basis in the vertical or horizontal direction from the pixel Pt1 for identifying the first candidate region NT1 to move the target candidate position sequentially, thereby identifying each target candidate region from among the (M1×N1) candidate regions. The target pixel-position is a position of a pixel in the reference range REa for identifying the candidate region.

After one target candidate region is identified, in S410, the CPU 410 calculates a similarity ratio (SC/Nt) of the target candidate region. The similarity ratio (SC/Nt) of the target candidate region is an index value indicating the degree of similarity between the target candidate region and the reference region SPa.

The calculation method of the similarity ratio (SC/Nt) will be explained. The CPU 410 selects each of a plurality of pixels in the target candidate region as a target pixel, and determines whether the target pixel is a similar pixel or a non-similar pixel. More specifically, the CPU 410 calculates a difference ΔVP between the component value of the target pixel in the target candidate region and the component value of a pixel in the reference region SPa corresponding to the target pixel. The pixel in the reference region SPa that corresponds to the target pixel is a pixel in the reference region SPa that overlaps with the target pixel when the target candidate region is overlapped with the reference region SPa so that the pixel Pc (FIG. 5(A)) is positioned at the target pixel-position. Here, the component values of the two pixels from which the difference ΔVP is calculated are (R1, G1, B1) and (R2, G2, B2). The difference ΔVP is represented by the sum of absolute values of differences of three types of component values, for example. That is, the difference ΔVP is the sum of an absolute value of (R1-R2), an absolute value of (G1-G2), and an absolute value of (B1-B2).

If the calculated difference ΔVP is less than or equal to a predetermined reference value TH1, the CPU 410 judges that the target pixel is a similar pixel. If the calculated difference ΔVP is greater than the predetermined reference value TH1, the CPU 410 judges that the target pixel is a non-similar pixel. This is because the color of the target pixel in the target candidate region is similar to the color of the pixel in the reference region SPa corresponding to the target pixel when the difference ΔVP is less than or equal to the predetermined reference value TH1. The CPU 410 repeatedly performs the above determination for each pixel in the target candidate region.

The CPU 410 calculates the similarity ratio (SC/Nt) of the target candidate region by dividing the number of similar pixels SC in the target candidate region by the total number of pixels Nt in the target candidate region. The similarity ratio (SC/Nt) is a ratio of the number of similar pixels SC to the total number of pixels Nt in the target candidate region. The larger the similarity ratio (SC/Nt) is, the more the reference region SPa is similar to the target candidate region.

In S415, the CPU 410 determines whether the similarity ratio (SC/Nt) is greater than or equal to a threshold value TH2. That is, the CPU 410 determines whether the current target candidate region is similar to the reference region SPa.

If the similarity ratio (SC/Nt) is greater than or equal to the threshold value TH2, or if the CPU 410 judges that the current target candidate region is similar to the reference region SPa (S415: YES), the CPU 410 in S420 records the current target candidate region as a similar region similar to the reference region SPa assigned with the similarity ratio of the current target candidate region in the buffer region 421, and moves to S425.

If the similarity ratio (SC/Nt) is less than the threshold value TH2 (S415: NO), the CPU 410 skips S420 and moves to S425.

In S425, the CPU 410 determines whether all the (M1×N1) candidate regions have been processed as the target candidate region. If there is an unprocessed candidate region (S425: NO), the CPU 410 returns to S405, and selects the unprocessed candidate region as the target candidate region. If all the candidate regions have been processed (S425: YES), the CPU 410 moves to S430.

In S430, the CPU 40 determines whether the (M1×N1) candidate regions include at least one similar region. The CPU 410 determines whether there is at least one candidate region recorded in S420 as the similar region. If there is at least one similar region (S430: YES), in S435 the CPU 410 selects one similar region CPa with the highest similarity ratio (SC/Nt), which is calculated in S410, from among the at least one similar region.

In S440, the CPU 410 determines, on the basis of the position of the one similar region CPa selected, the relative arrangement position between the left-side original image AIL and the right-side original image AIR. In the embodiment, the CPU 410 determines the relative position in a direction along the ends of the original images AIL and AIR corresponding to the folded line VL. That is, the CPU 410 determines the relative position in the vertical direction of FIG. 14. More specifically, the CPU 410 identifies a pixel position Ps (see FIG. 12(B), for example) in the reference range REa corresponding to the similar region CPa selected in S435. For example, if the similar region CPa selected in S435 is the candidate region NT1 in FIG. 14, the pixel position Pt1 in the reference range REa is identified as the pixel position Ps in the reference range REa corresponding to the similar region CPa. That is, the pixel position Ps is the target pixel-position whose target candidate region is determined as the similar region in S435. The identified pixel position in the reference range REa in the vertical direction is set as the position of an upper-end pixel in the vertical direction in the right-side scan image AR3. In FIG. 12(B), the details of the blank spaces and additional regions are not shown for simplicity. The reference range REa is set with a definite relation to the left-side original image AIL. Accordingly, the CPU 410 sets the relative position between the left-side original image AIL and the right-side original image AIR in the vertical direction. In the first arrangement position determination process of the embodiment, the CPU 410 does not determine the relative position in the horizontal direction between the left-side original image AIL and the right-side original image AIR. This is because the relative position in the horizontal direction between the left-side original image AIL and the right-side original image AIR are set to a predetermined relative position. Specifically, the relative position in the horizontal direction between the left-side original image AIL and the right-side original image AIR is set so that the gap ΔIT is formed between the right side of the left-side original image AIL and the left side of the right-side original image AIR.

If there is no one similar region (S430: NO), in S445 the CPU 410 sets the relative position between the left-side original image AIL and the right-side original image AIR in the vertical direction to a default position. In the embodiment, the default position in the vertical direction is set to a position so that the upper end of the left-side original image AIL is aligned with the upper end of the right-side original image AIR.

After the relative position between the left-side original image AIL and the right-side original image AIR in the vertical direction has been determined in S440 or S445, the CPU 410 ends the first arrangement position determination process.

As described above, as shown in FIG. 13, a plurality of right-side restoration pixels inside the right-side restoration region AR is generated by using the values of a plurality of pixels in lines that are within the right-side original image AIR and along the left end of the right-side original image AIR in the first arrangement position determination process. By using the plurality of right-side restoration pixels, the relative position between the left-side original image AIL and right-side original image AIR are determined (FIG. 11). As a result, the arrangement position can be determined accurately so that the left-side original image AIL and the right-side original image AIR do not overlap with each other. When the arranged image representing one original 10 is generated by using two scan images generated by the scan pattern A, the appropriate arrangement position can be determined accurately.

If the scan pattern A is used, a band-like image located on the line VL of the original 10 appears on neither the original image AIL nor the original image AIR. If the relative position in the vertical direction between the original images AIL and AIR is determined without generating a plurality of right-side restoration pixels, there is a possibility that the relative position in the vertical direction is not determined accurately. In the embodiment, the right-side restoration pixels are generated, and the right-side restoration pixels are used to determine the relative position in the vertical direction between the original images AIL and AIR, thereby accurately determining the relative position.

As described above, as shown in FIG. 13, a plurality of left-side restoration pixels inside the left-side restoration region AL is generated by using the values of a plurality of pixels in lines that are within the left-side original image AIL and along the right end of the left-side original image AIL in the first arrangement position determination process. By using the plurality of left-side restoration pixels, the relative position between the left-side original image AIL and right-side original image AIR is determined according to the flowchart shown in FIG. 11. As a result, the arrangement position can be determined accurately so that the left-side original image AIL and the right-side original image AIR do not overlap with each other. If an image consisting of a plurality of left-side restoration pixels is similar to an image consisting of right-side restoration pixels, the arrangement position between the left-side original image AIL and the right-side original image AIR can be appropriately determined on the basis of the degree of similarity between the two images.

As shown in FIG. 12(A), the reference region SPa includes a plurality of right-side restoration pixels inside the right-side restoration region AR and does not include pixels inside the right-side original image AIR. The original images AIL and AIR are images obtained by reading both sides of the half-folded original 10. Therefore, there is no region of the original 10 that would appear on both the document images AIL and AIR. Thus, it is sufficient for the reference region SPa to have a plurality of right-side restoration pixels, and there is no need for the reference region SPa to have pixels inside the right-side original image AIR. As a result, the relative position between the two original images AIL and AIR can be determined even more appropriately.

A-5. Second Arrangement Position Determination Process

Figure 15:
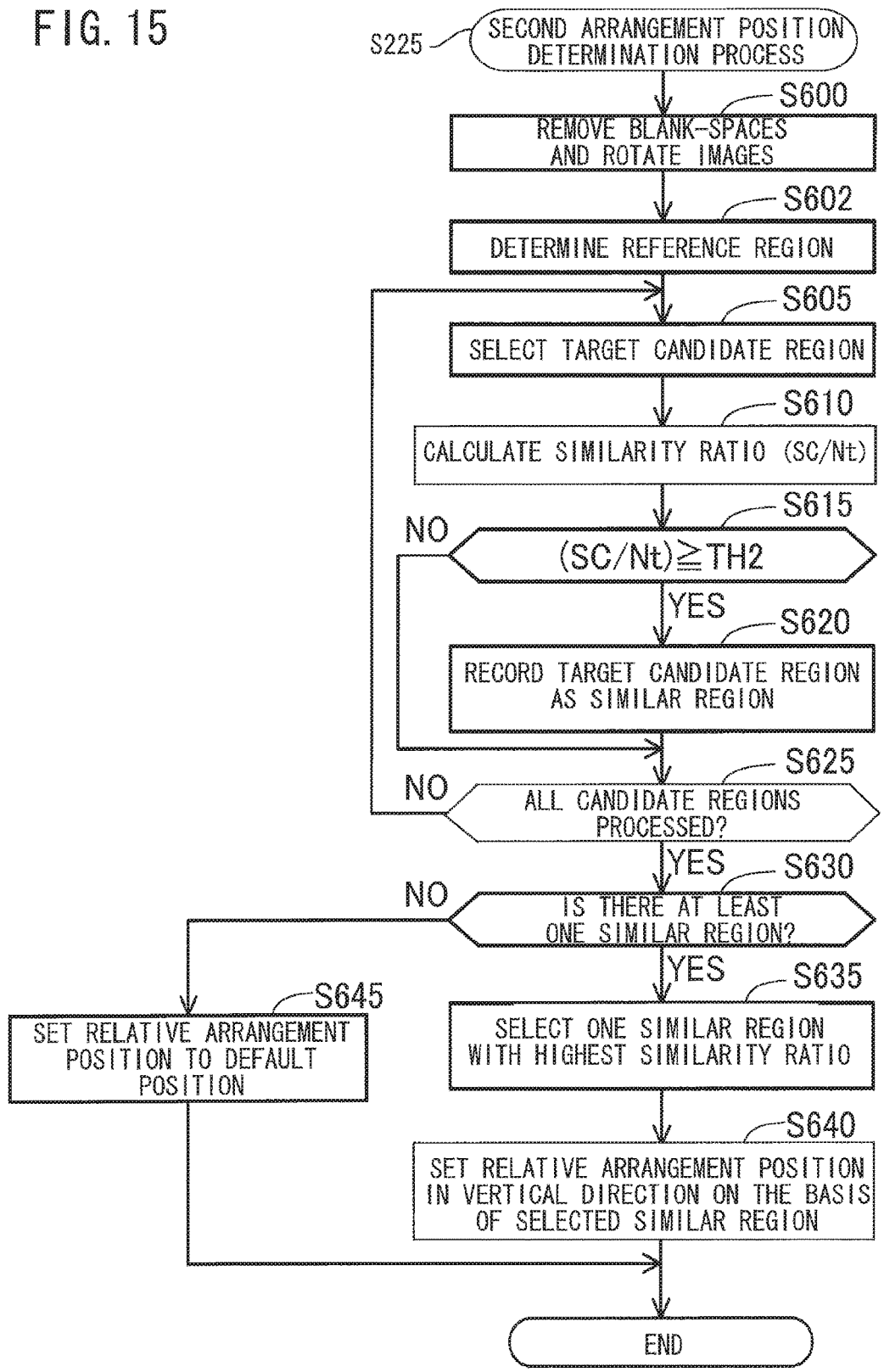
FIG. 15 is a flowchart illustrating a second arrangement position determination process according to the first embodiment.
Figure 16A:
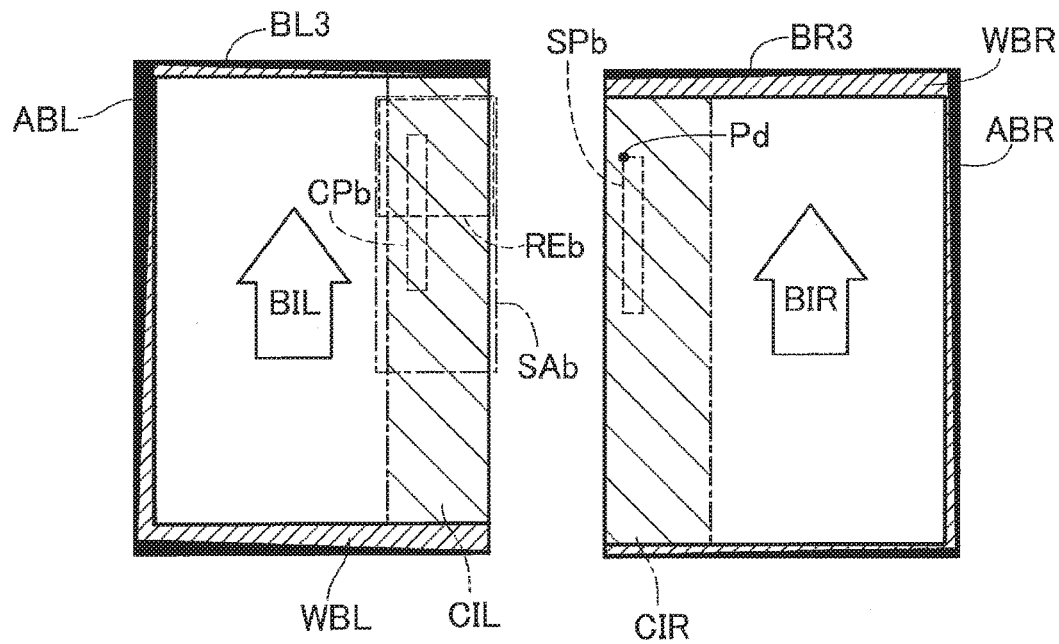
FIG. 16(A) is an explanatory diagram illustrating the first arrangement position determination process shown in FIG. 15.
Figure 16B:
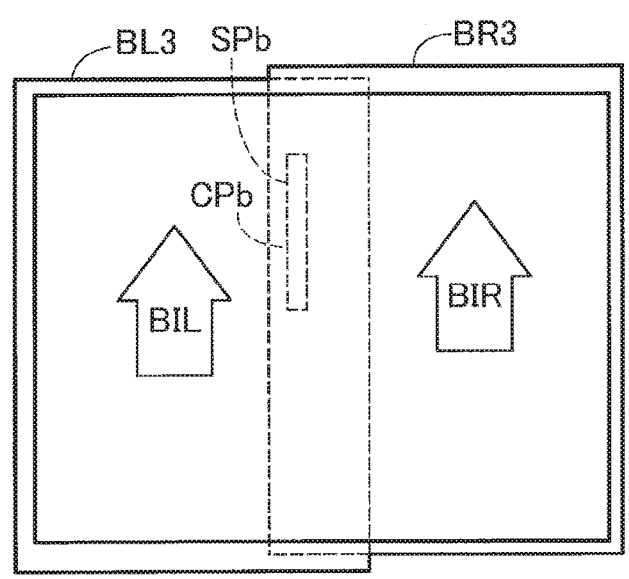
FIG. 16(B) is an explanatory diagram illustrating a relative position set in the first arrangement position determination process shown in FIG. 15.

The second arrangement position determination process of S225 (FIG. 8) will be described. FIG. 15 is a flowchart illustrating the second arrangement position determination process. FIGS. 16(A) and 16(B) are explanatory diagrams illustrating the second arrangement position determination process. The second arrangement position determination process is executed when the scan pattern B is used. The description below will focus on the case where the scan images BL2 and BR2 of FIG. 7(B) are to be processed as an example.

In S600, the CPU 410 performs blank-space removal and rotation of the scan images BL2 and BR2, similarly to S400 shown in FIG. 11. FIG. 16(A) shows scan images BL3 and BR3 that are obtained by performing the process S600 on the scan images BL2 and BR2. There are substantially no blank spaces on the right-end sides of the scan images BL2 and BR2. So, only portions on the right side of the process start position STP (FIG. 7B) have been removed. As a result of the rotation, the upward direction of the right-side original image BIR in the right-side scan image BR3 coincides with the upward direction of the left-side original image BIL in the left-side scan image BL3. In the second arrangement position determination process, the pixel restoration process is not performed.

In S602, the CPU 410 determines a reference region SPb located in the right-side scan image BR3. The reference region SPb is a partial region of the right-side scan image BR3. As shown in FIG. 16(A), the reference region SPb is set as a rectangular region of a predetermined size placed at a prescribed position inside the right-side scan image BR3. The reference region SPb is disposed inside an image CIR that represents the central portion CA (FIG. 3) of the original 10, in the right-side scan image BR3. For example, the reference region SPb is disposed along an end (or left end in this embodiment) along the image CIR representing the central portion CA from among the four ends of the right-side scan image BR3. The length of the reference region SPb in the horizontal direction is between 50 pixels and 150 pixels, for example. The length of the reference region SPb in the vertical direction is between one-fourth and half of the vertical-direction length of the right-side scan image BR3.

In S605, the CPU 410 selects one target candidate region from among a plurality of candidate regions. Here, the plurality of candidate regions are determined on the basis of a prescribed reference range REb. The reference range REb is defined in relation to the scan image BL3. For example, as shown in FIG. 16(A), the reference range REb is indicated by broken line in a portion neighboring the right end of the left-side original image BIL. The reference range REb is a rectangular area that is M2 pixels (vertical direction)×N2 pixels (horizontal direction) (M1 and N1 are integers greater than or equal to 2). For example, N2 is several hundreds, and M1 is between tens and hundreds. The right end of the reference range REb is in accordance with the right end of the left-side original image BIL. The left side of the reference range REb is located on the left side of the left end of the image CIL representing the central portion CA in the left-side original image BIL. The central position of the reference range REb in the vertical direction is the same as that of the upper end of the reference region SPb of the right-side original image BIR when the upper end of the scan image BL3 is in accordance with the upper end of the scan image BR3.

The CPU 410 selects one target position from among the positions of (M2×N2) pixels inside the reference range REb. The CPU 410 identifies, as a target region, a region that is inside the left-side original image BIL and overlaps with the reference region SPb if the reference region SPb is disposed so that a pixel Pd (FIG. 16A) is positioned at the target position. Here, the pixel Pd is positioned at the upper left end of the reference region SPb. In this manner, the method for identifying the target region by referencing the reference range REb is similar to that of the first arrangement position determination process described with reference to FIG. 14. A search region SAb is defined as a region in which a candidate region can be set. The search region SAb is located neighboring the right end of the left-side original image BIL, as shown in FIG. 16(A). The search region SAb includes a relatively large area of the image CIL representing the central portion CA in the left-side original image BIL. As a result, there is a high probability that a similar region similar to the reference region SPb can be determined inside the search region SAb.

The processes S610-S635 in FIG. 15 are the same as those of S410 to S435 in FIG. 11. That is, during the processes S610-S635, one similar region CPb with the highest similarity ratio with respect to the reference region SPb is determined from among the (M2×N2) regions set in the search region SAb.

After the similar region CPb is determined, in S640 the CPU 410 determines the relative arrangement position between the left-side original image BIL and the right-side original image BIR on the basis of the positions of the determined similar region CPb and the reference region SPb. Subsequently, the CPU 410 ends the second arrangement position determination process. More specifically, as shown in FIG. 16(B), the arrangement position is determined so that the reference region SPb in the right-side original image BIR overlaps with the similar region CPb of the left-side original image BIL. In this manner, the second arrangement position determination process determines both the relative position in the vertical direction and the relative position in the horizontal direction on the basis of the similar region CPb and the reference region SPb.

If the similar region CPb cannot be determined (S630: NO), in S645 the CPU 410 sets the relative arrangement position between the left-side original image BIL and the right-side original image BIR at a default position, ends the second arrangement position determination process. At the a default position, the right end of the left-side scan image BL3 simply abuts on the left end of the right-side scan image BR3 on the entire length, for example.

According to the second arrangement position determination process, in a first target image (the right-side scan image BR), the image CIR represents the central portion CA of the original 10. The central portion CA is represented in both the original images BIL and BIR. In the second arrangement position determination process, the reference region SPb is determined in the image CIR. The search region SAb is a partial region inside the left-side original image BIL. The similar region CPb is identified from the search region Sab (S605 to S635). The similar region CPb includes a similar image similar to an image inside the reference region Spa. The relative position between the two original images BIL and BIR is determined on the basis of the positions of the reference region SPa and similar region CPb (S640). As a result, the arrangement position at which the left-side original image BIL partially overlaps with the right-side original image BIR can be determined accurately. When an arranged image representing one original 10 is generated by using two scan images generated according to the scan pattern B, the appropriate arrangement position can be accurately determined.

In this manner, the arrangement position at which a first target image partially overlaps with a second target image partially can be determined accurately. When the scan pattern B is used, the central portion CA of the original 10 appears on both the two original images BIL and BIR. Accordingly, it is appropriate to determine the reference region SPb inside the image CIR that represents the central portion CA, and there is no need to perform the pixel restoration process of the first arrangement position determination process.

The left-side original images AIL and BIL are examples of a first object image. The left scan images AL1 and BL1 are examples of a first image. The right-side original images AIR and BIR are examples of a second object image. The right scan images AR1 and BR1 are examples of a second image. A first condition, a second condition correspond to the determination of whether the amount of the blank space is greater than or equal to a reference level performed in the blank-space amount determination. A first pixel and a second pixel correspond to the specific color pixel.

B. Second Embodiment

In the first embodiment, the two original images are arranged in the arranged image so that two predetermined ends of the two original images are placed in the central portion in the horizontal direction. This is because a user is supposed to put the original 10 on the document table 255 with the original 10 being oriented to a predetermined direction. However, if the user mistakenly puts the original 10 on the document table 255 with the original being oriented to a wrong direction, the two original images may not be disposed in a proper direction in the arranged image.

In the first embodiment, for example, as shown in FIGS. 4(B), 4(C), 6(A), and 6(B), the original 10 is disposed on the document table 255 so that the upper end of the document table 255 is aligned with the upper end of the original 10. Instead, in the second embodiment, for example, in the case of the scan pattern A, the original 10 is disposed on the document table 255 so that the center of the document table 255 in the up-to-down direction shown in FIGS. 4(B) and 4(C) is in accordance with the center of the original 10 in the up-to-down direction. As a result, there exist regions (blank-space regions), where no original 10 is placed, in a region of the upper-end side of the document table 255 and in a region of the lower-end side of the document table 255 shown in FIGS. 4(B) and 4(C). In other words, there exist two blank-space regions in the scan image.

In the case of the scan pattern B, the original 10 is placed on the document table 255 so that the center of the document table 255 in the up-to-down direction shown in FIGS. 6(A) and 6(B) is in coincident with the center of the left region 10L of the original 10 in the up-to-down direction or the center of the right region 10R in the up-to-down direction. As a result, there is a region (blank-space region), where no original 10 is placed, in one of a region of the upper side of the document table 255 and a region of the lower side of the document table 255 as shown in FIGS. 6(A) and 6(B). There is no blank-space region in remaining one of the region of the upper side of the document table 255 and the region of the lower side of the document table 255.

FIGS. 17(A)-17(D) are explanatory diagrams showing scan images BL1$a$, BL1$b$, BR1$a$, and BR1$b$ generated when the document is read according to the scan pattern B. As shown in FIGS. 17(A)-17(D), a blank space appears on the left or right side, while no blank space appears on the other side in each of the scan images BL1$a$, BL1$b$, BR1$a$, and BR1$b$. Although not shown in the diagrams, in the case of the scan pattern A, blank spaces appear on both the left and right sides of a generated scan image.

The left-side original image BIL can be rendered upside-down depending on the orientation to which the original 10 is disposed on the document table 255. For example, there are two types of left-side scan images (BL1*a* and BL1*b*) including the left-side original images BIL (FIGS. 17(A)-17(D)). The upward direction of the left-side original image BIL in the scan image BL1*a* is opposite to the upward direction of the left-side original image BIL in the scan image BL1*b*. Similarly, there are two types of right-side scan images (BR1*a* and BR1*b*) including the right-side original images BIR. The upward direction of the right-side original image BIR in the scan image BR1*a* is opposite to the upward direction of the right-side original image BIR in the scan image BR1*b*.

FIG. 17(A) shows a combination of the left-side scan image BL1*a* and the right-side scan image BR1*a* that are generated when the original 10 is placed on the document table 255 as shown in FIGS. 6(A) and 6(B). In this case, in the arranged image, the right end of the left-side original image BIL and the right end of the right-side original image BIR should be positioned in the central portion in the horizontal direction. For example, as described in the first embodiment, it is appropriate that the right-side original image BIR is rotated 180 degrees and subsequently disposed in the arranged image.

FIG. 17(B) shows a combination of the left-side scan image BL1*a* and the right-side scan image BR1*b*. In this case, in the arranged image, the right end of the left-side original image BIL and the left end of the right-side original image BIR should be positioned in the central portion in the horizontal direction.

FIG. 17(C) shows a combination of the left-side scan image BL1*b* and the right-side scan image BR1*a*. In this case, in the arranged image, the left end of the left-side original image BIL and the right end of the right-side original image BIR should be positioned in the central portion in the horizontal direction.

FIG. 17(D) shows a combination of the left-side scan image BL1*b* and the right-side scan image BR1*b*. In this case, in the arranged image, the left end of the left-side original image BIL and the left end of the right-side original image BIR should be positioned in the central portion in the horizontal direction.

As described above, there are following four combinations of two ends that should be positioned in the central portion inside the arranged image in the horizontal direction: (a) the right end of the left-side original image BIL and the right end of the right-side original image BIR; (b) the right end of the left-side original image BIL and the left end of the right-side original image BIR; (c) the left end of the left-side original image BIL and the right end of the right-side original image BIR; and (d) the left end of the left-side original image BIL and the left end of the right-side original image BIR.

When the scan pattern B is used, there is no blank space on a one-end side that should be positioned in the central portion in the horizontal direction in the arranged image. If the same blank-space amount determination process as that of the first embodiment is performed on a blank space on the one-end side, it is determined that the amount of blank space on the one-end side is less than the reference level. On the other hand, there is a blank space on the other-end side that should not be positioned in the central portion in the horizontal direction in the arranged image. If the same blank-space amount determination process as that of the first embodiment is performed on an amount of blank space on the other-end side, it is determined that the amount of blank space on the other-end side is greater than or equal to the reference level.

According to the second embodiment, when the scan pattern B is used, the blank-space amount determination process is performed on each of the four combinations of the two ends. As a result, an appropriate combination can be determined. Such a determination is performed in a pre-arrangement process of the second embodiment.

Figure 18:
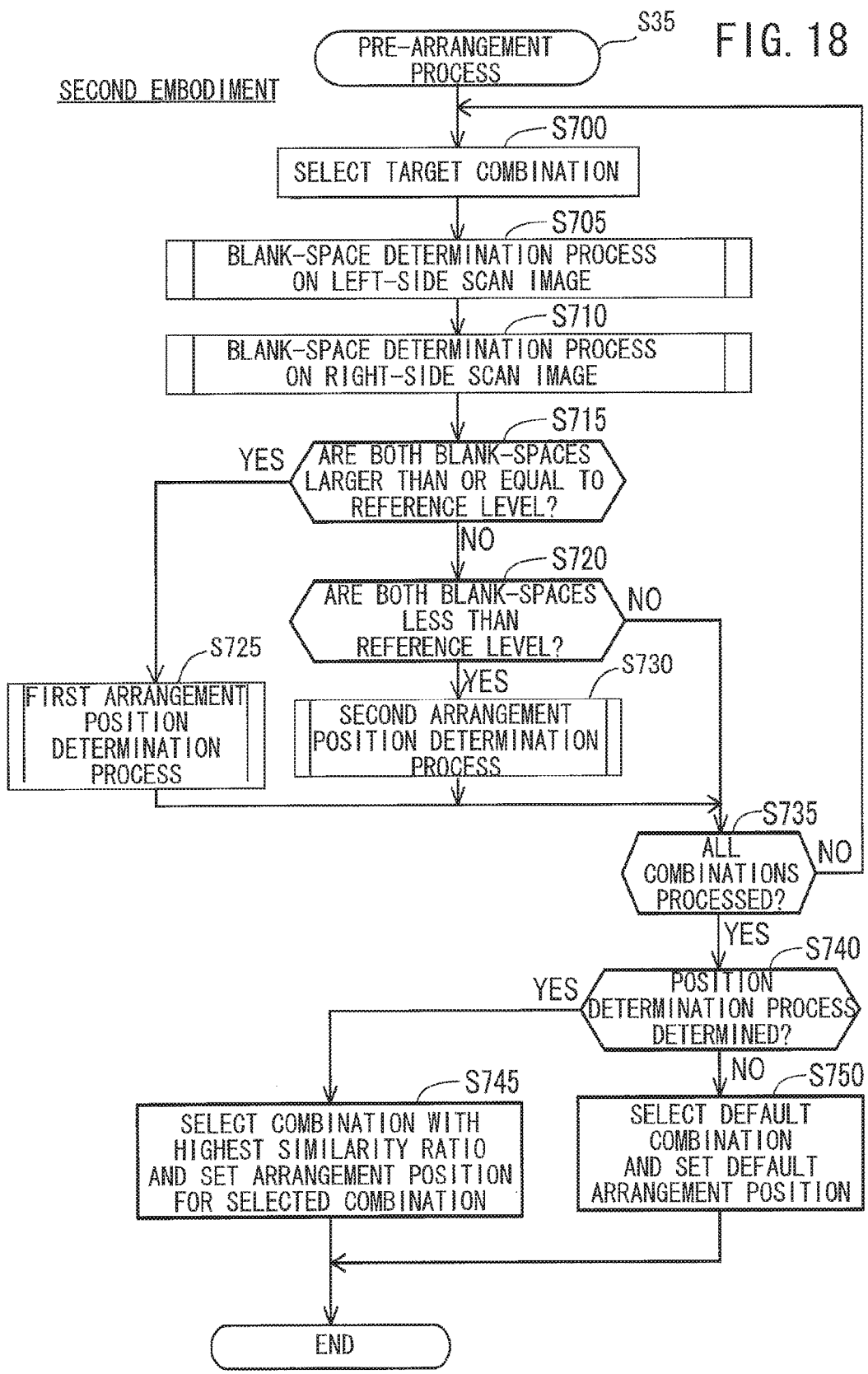
FIG. 18 is a flowchart illustrating a pre-arrangement process according to a second embodiment.

FIG. 18 is a flowchart illustrating the pre-arrangement process according to the second embodiment. In S700, the CPU 410 selects a target combination of the two ends from among the above-described four combinations. Hereinafter, two ends constituting the target combination are referred to as specific ends In S705, the CPU 410 performs the blank-space amount determination process on the left-side scan image. Specifically, the CPU 410 performs the blank-space amount determination process on a blank space on a specific-end side concerning the left-side scan image from among the two specific ends of the target combination. Steps of the blank-space amount determination process are the same as those of the blank-space amount determination process (FIG. 10) on the right-side blank space in the scan image according to the first embodiment. As a result, the CPU 410 determines whether the amount of blank space on the specific-end side of the left-side scan image is greater than or equal to the reference level.

In S710, the CPU 410 performs the blank-space amount determination process on the right-side scan image. Specifically, the CPU performs the blank-space amount determination process on a blank space of a specific-end side concerning the right-side scan image from among the two specific ends the target combination. As a result, the CPU 410 determines whether the amount of blank space on the specific-end side of the right-side scan image is greater than or equal to the reference level.

In S715, the CPU 410 determines whether both the amounts of blank spaces on the specific-end sides in the two scan images are greater than or equal to the reference level on the basis of the results of the determinations in S705 and S710. If both the amounts of blank spaces on the specific-end sides are greater than or equal to the reference level (S715: YES), in S725 the CPU 410 performs the first arrangement position determination process. That is, in this case, the first arrangement method is selected.

If one of the amounts of blank spaces on the specific-end sides is less than the reference level (S715: NO), in S720 the CPU 410 determines whether both the amounts of blank spaces on the specific-end sides of the two scan images are less than the reference level on the basis of the results of the determinations in S705 and S710. If both the amounts of blank spaces on the specific-end sides are less than the reference level (S720: YES), in S730 the CPU 410 performs the second arrangement position determination process. That is, in this case, the second arrangement method is selected.

Steps of the first arrangement position determination process and the second arrangement position determination process are the same as those of the first arrangement position determination process and the second arrangement position determination process of the first embodiment. Each of the processes determines the arrangement position of the two original images so that, in the arranged image, the two specific ends are positioned in the central portion in the horizontal direction.

If one of the amounts of blank spaces on the specific-end sides is less than the reference level while remaining one of the amount of blank spaces is greater than or equal to the reference level (S720: NO), the CPU 410 does not perform any arrangement position determination process, and moves on to S735. In this case, no arrangement method is selected.

In S735, the CPU 410 determines whether all the two combinations have been processed. If there is an unprocessed combination (S735: NO), the CPU 410 returns to S700 and selects an unprocessed combination as a target combination.

If all the combinations have been processed (S735: YES), in S740 the CPU 410 determines whether the first or second arrangement position determination process has been performed on at least one combination and whether the arrangement positions of the two original images have been determined. If the arrangement positions for the at least one combination has been determined (S740: YES), in S745 the CPU 410 selects, as a combination for generating an arranged image, a combination for which a similar region having the highest similarity ratio is determined in the first or second arrangement position determination process. The CPU 410 sets, as an arrangement position of the two original images for generating an arranged image, the arrangement position of the two original images determined for the selected combination.

If the arrangement positions for all the combinations have not been determined (S740: NO), in S750 the CPU 410 sets a combination to a default combination as an arrangement position of the two original images for generating an arranged image. For example, the CPU 410 sets, as the default combination, the combination (a) the right end of the left-side original image BIL and the right end of the right-side original image BIR among the four combinations (a) to (d). The CPU 410 sets the arrangement position of the two original images for generating an arranged image to a default arrangement position. For example, the default arrangement position is the same as the default arrangement position determined in S645 of FIG. 15 explained in the first embodiment.

After the pre-arrangement process is ended, the CPU 410 generates arranged image data representing an arranged image where the two original images is arranged so that the two specific ends determined during the pre-arrangement process are positioned in the central portion in the horizontal direction in the arranged image generation process according to the second embodiment.

According to the configurations of the second embodiment, a specific combination of one end of the left-side original image and one end of the right-side original image is selected as a target combination (S700). (1) For the two ends specified by the specific combination selected, if the amount of blank space of the left-side original image is greater than or equal to the reference level and the amount of blank space of the right-side original image is greater than or equal to the reference level (S715: YES), the first arrangement method is selected (S725). In this case, the target combination may specify the two ends that should be positioned in the central portion of the arranged image in the horizontal direction. Further in this case, there is a high possibility that the scan pattern A has been used. Therefore, the first arrangement method should be used to determine the arrangement position.

(2) In the second embodiment, for the two ends specified by the specific combination selected, if the amount of blank space of the left-side original image is less than the reference level and the amount of blank space of the right-side original image is less than the reference level (S720: YES), the second arrangement method is selected (S730). In this case, the target combination may specify two ends that should be positioned in the central portion of the arranged image in the horizontal direction. Further in this case, there is a high possibility that the scan pattern B has been used. Therefore, the second arrangement method should be used to determine the arrangement position.

(3) For the two ends specified by the specific combination selected, if the amount of blank space of the left-side original image is greater than or equal to the reference level and the amount of blank space of the right-side original image is less than the reference level, or if the amount of blank space of the left-side original image is less than the reference level and the amount of blank space of the right-side original image is greater than or equal to the reference level (S720: NO), no arrangement method is selected. In this case, the target combination is unlikely to specify two ends that should be positioned in the central portion of the arranged image in the horizontal direction.

If no arrangement method is selected (S720: NO), the CPU 410 selects another combination as a specific combination (S700), and performs again the above-describe processes (1) to (3) on the two-end combination selected.

As a result, the arrangement method can be selected appropriately depending on whether the amounts of blank space on specific-end sides of the two original images are greater than or equal to the reference level. Moreover, the arrangement directions of the two original images in the arranged image, or, for example, whether one original image should be rotated 180 degrees relative to the other original image, can be appropriately determined.

Furthermore, in the second embodiment, even after the arrangement position is determined for one combination, the processes are performed for all the combinations (S735). Finally, the combination of two ends for which a similar region with the highest similarity ratio is set as a combination to be positioned in the central portion of the arranged image in the horizontal direction. As a result, the combination to be positioned in central portion in the horizontal direction can be determined accurately.

C. Third Embodiment

Similarly to the second embodiment, a pre-arrangement process is performed for determining a combination of two ends that are located in a central portion of the arranged image in the horizontal direction according to a third embodiment. FIG. 19 is a flowchart illustrating the pre-arrangement process according to the third embodiment. Processes S800-S815 shown in FIG. 19 are the same as the processes S700-S715 shown in FIG. 18.

If both the amounts of blank space on specific-end sides of the two scan images are greater than or equal to a reference level (S815: YES), in S820 the CPU 410 performs the first arrangement position determination process similarly to the second embodiment. In this case, the first arrangement method is selected. If at least one of the amounts of blank space on specific-end sides of the two scan images is less than the reference level (S815: NO), in S825 the CPU 410 performs the second arrangement position determination process. In this case, the second arrangement method is selected. The third embodiment is different from the second embodiment in that an arrangement method is always selected for the two specific ends specified by the target combination.

In S830, the CPU 410 determines whether a similar region with a similarity ratio greater than or equal to a threshold value has been determined in the latest first or second arrangement position determination process performed. If a similar region with a similarity ratio greater than or equal to the threshold value has been determined (S830: YES), in S835 the CPU 410 sets the current target combination as an combination used when generating an arranged image. The CPU 410 sets the arrangement position of the two original images determined on the basis of the two specific ends of the combination as arrangement position of the two original images for generating an arranged image.

If a similar region with a similarity ratio greater than or equal to the threshold value has not been determined (S830: NO), in S840 the CPU 410 determines whether all the combinations have been processed. If there is an unprocessed combination (S840: NO), the CPU 410 returns to S800 and selects an unprocessed combination as a target combination.

If all the combinations have been processed (S840: YES), in S845 the CPU 410 sets a default combination as a combination used when generating an arranged image. The CPU 410 sets the arrangement position of the two original images for generating an arranged image to a default arrangement position. The default combination and the default arrangement position are the same as in the second embodiment, for example.

According to the third embodiment, in S800 the CPU 410 selects a specific combination of one end of the left-side original image and one end of the right-side original image as a combination specifying target two ends. The CPU 410 selects an arrangement method on the basis of the selected combination (S815-S825). If an appropriate arrangement position cannot be determined in the arrangement position determination process that uses the selected arrangement method, that is, if the CPU 410 cannot determine the similar region having a similarity ratio greater than or equal to the threshold value, the CPU 410 selects another combination as a specific combination (S800), and selects again an arrangement method determined on the basis of the specific combination selected (S815 to S825). As a result, the arrangement directions of the two original images in the arranged image can be appropriately determined on the basis of whether the arrangement position can be determined with the use of the selected arrangement method. Here, the arrangement method is selected on the basis of the determination of whether the amounts of blank space on specific-end sides of the two original images are greater than or equal to the reference level.

Unlike the second embodiment, there is no need to process all the combinations. Therefore, the processing speed can be improved.

D. Modifications (1) In the second embodiment, for two ends specified by the target combination, if the amount of blank space of one of the two scan images is less than the reference level while the amount of blank space of the other is greater than or equal to the reference level, no arrangement position determination process is performed. That is, no arrangement method is selected for the target combination. Alternatively, for such a target combination, the first or second arrangement position determination process may be performed to determine the arrangement position. In this case, in S745, one arrangement position may be chosen from among all the arrangement positions determined.

(2) In the first embodiment, the blank-space amount determination is performed on both the left-side scan image and the right-side scan image (S205 and S210 in FIG. 9). Instead, the blank-space amount determination may be performed on one of the left-side scan image and the right-side scan image. In this case, if the amount of blank space in the right side of one scan image is greater than or equal to the reference level, the first arrangement method is selected. If the amount is less than the reference level, the second arrangement method is selected.

(3) In the first embodiment, as shown in FIGS. 4(B), 4(C), 6(A) and 6(B), the original 10 is assumed to put on the document table 255 with a prescribed direction of the original directed to a predetermined direction of the document table 255. However, while the line VL of the original 10 is assumed to be disposed on the near side (or lower side of FIGS. 4(B) and 4(C)) of the document table 255, there is a possibility that the line VL is mistakenly disposed on the far side (or upper side of FIGS. 4(B) and 4(C)) of the document table 255 particularly when the scan pattern A is used. Accordingly, in the first embodiment, the first arrangement position determination process of FIG. 11, which is executed when the scan pattern A is used, may be repeated four times on the four combinations (a) to (d) of two ends described in the second embodiment. In each of the four first arrangement position determination processes, the similar region having the highest similarity ratio is selected in S435 and the relative arrangement position is determined on the basis of the selected similar region in S440. Accordingly, after the first arrangement position determination processes are performed four times, four relative arrangement positions concerning four selected similar regions are obtained. In this case, the CPU 410 finally selects one relative arrangement position concerning a selected similar region having the highest similarity ratio among the four selected similar regions.

(4) In the pre-arrangement process of the first embodiment shown in FIG. 8, the CPU 410 selects one of the first or second arrangement position determination process by determining whether the amounts of blank space on the right-end sides of the two scan images (AL2 and AR2 in FIG. 5(B), or BL2 or BR2 in FIG. 7(B)) are greater than or equal to the reference level. Instead, the CPU 410 may determine whether the amounts of blank space on both of the right-end and left end sides of the two scan images, and select one of the first or second arrangement position determination process on the basis of the results of the determinations. For example, in the case of the scan pattern B, if the original 10 is properly disposed on the document table 255 as shown in FIGS. 6(A) and 6(B), there is almost no blank space on both the right-end and left-end sides of the two scan images. On the other hand, in the case of the scan pattern A, if the original 10 is properly disposed on the document table 255 as shown in FIGS. 4(B) and 4(C), there is almost no blank space on one side of the two scan images while there is a blank space on the other side. Accordingly, if the amounts of blank space on both the right-end and left-end sides of the two scan images are less than the reference level, the CPU 410 may select that the second arrangement position determination process as a process to be performed. If at least one of the amounts of blank space on the right-end and left-end sides of the two scan images is greater than or equal to the reference level, the CPU 410 may selects the first arrangement position determination process as a process to be performed.

(5) In the first embodiment, a determination condition for determining that the amount of blank space is greater than or equal to the reference level is that the blank-space line number WLN is greater than or equal to the threshold value THw. Instead, other determination conditions may be used. For example, the CPU 410 detects ends of an original image in a scan image in order to identify a region of the original image, That is, the identified region of the original image is defined by the upper, lower, left and right ends of the original image. Then, the CPU 410 calculates the number of pixels that continuously appear in the horizontal direction between the right end of the identified original image and the right end of the scan image among pixels outside the identified region. If the number of pixels that continuously is arranged in the horizontal direction is greater than or equal to a threshold value, the CPU 410 may determine that the amount of blank space is greater than or equal to a reference level.

(6) In the pixel restoration process of the first embodiment shown in FIG. 13, pixels of the left-side original image AIL are used to generate left-side restoration pixels in the left-side restoration region AL, and pixels of the right-side original image AIR are used to generate right-side restoration pixels in the right-side restoration region AR. Instead, only one of the left-side restoration pixels and the right-side restoration pixels may be generated. For example, if only the right-side restoration pixels are generated and no left-side restoration pixel is generated, the reference region SPa is a region consisting of right-side restoration pixels similarly to the first embodiment, while the search region SAa is a region including only a region in the left-side original image AIL neighboring the right end of the left-side original image AIL unlike the first embodiment. On the other hand, if only the left-side restoration pixels are generated and no right-side restoration pixel is generated, the reference region SPa is a region in the right-side original image AIR neighboring the left end of the right-side original image AIR unlike the first embodiment, while the search region SAa is a range that includes a region neighboring the right end of the left-side original image AIL and a region consisting of left-side restoration pixels.

(7) In the scan pattern A, the two sets of image data representing respectively the image including the original image AIL and the image including the original image AIR are generated (S15 in FIG. 2) by reading both sides of the original 10 that is folded in half along the line VL. Instead, the two sets of image data representing respectively the image including the original image AIL and the image including the original image AIR may be generated by reading, in two passes, two pieces of the original 10 that are physically cut and separated along the line VL.

(8) In the above-described embodiments, the arranged image data representing an arranged image is generated so that the left-side original image and the right-side original image are arranged in the horizontal direction. Instead, arranged image data representing an arranged image may be generated so that an original image and another original image are arranged in the vertical direction. In this case, the CPU 410 determines whether the amount of blank space on the lower side of a scan image including the one original image is greater than or equal to a reference level, and whether the amount of blank space on the upper side of a scan image including the another original image is greater than or equal to the reference level. A method for arranging the one original image and the another original image in the arranged image may be set on the basis of the results of the determinations.

(9) The processes performed by the CPU 410 of the server 400 (S25-S40 of FIG. 2, for example) may be performed by the CPU 210 of the multifunction peripheral 200. In this case, the image processing system 1000 may not have the server 400 and the multifunction peripheral 200 may perform the entire process of FIG. 2. Alternatively, the processes performed by the CPU 410 of the server 400 may be performed by a CPU (not shown) of the personal computer 500. For example, the CPU (not shown) of the personal computer 500 may execute a scanner driver program installed in the personal computer 500 to execute the processes of the CPU 410. The server 400 is a single computing machine in the embodiments. However, the server 400 may be a computing system including a plurality of computing machines capable of communicating each other.

(10) In the above-described embodiments, in S25 the server 400 receives scan data in an image-file format, and in S45 the server 400 outputs (sends) the arranged image data in an image-file format. Instead, if the CPU 210 of the multifunction peripheral 200 performs the processes of S25 to S45 as explained in the modified embodiment (9), the CPU 210 may acquire the scan data generated by the scanning unit 250 without converting the scan data into an image file. The CPU 210 may output the arranged image data by printing the arranged image data on paper, without converting the arranged image data into an image file.

(11) In the embodiments, two image files are used to generate arranged image data representing an arranged image where the two original images are arranged. However, the present disclosure is not limited to this. Any number of image files may be used to generate one set of arranged image data. For example, four image files may be used to generate an arranged image file representing an arranged image where four original images are arranged.

(12) In the embodiments, two sets of image data used to generate arranged image data are generated by the scanning unit 250 of the multifunction peripheral 200. However, the present disclosure is not limited to this. Various types of image data representing optically-read images may be used. For example, a digital camera may take pictures of both sides of the half-folded original 10 to generate the two sets of the image data. Alternatively, a digital camera optically reads respectively the left region 10L and partial region CAR of the original 10, and the right region 10R and partial region CAL of the original 10 and generates two sets of image data and generates two sets of image data. The image data is not limited to image data generated by a reading device (scanner or digital camera). The image data may be created by application programs, such as those for drawing creation or document creation.

(13) Part of the configuration implemented in hardware in the embodiments described above may be replaced with software and, conversely, part of the configuration implemented in software in the embodiments may be replaced with hardware.

When all or part of the functions in the present disclosure are implemented by computer programs, the programs can be stored on a computer-readable storage medium (a non-temporary storage medium, for example). The programs may be used from the same storage medium on which they are provided (an example of a computer-readable storage medium), or may be first loaded onto a different storage medium (an example of a computer-readable storage medium). The "computer-readable storage medium" may be a portable medium, such as a memory card or CD-ROM; an internal storage device built into the computer, such as any of various ROM; or an external storage device, such as a hard disk drive connected to the computer.

While the disclosure has been described in detail with reference to the above embodiments thereof, it would be apparent to those skilled in the art that various changes and modifications may be made therein.

What is claimed is:

1. An image processing device comprising:
   a processor; and
   a memory storing computer-readable instructions therein, the computer-readable instructions, when executed by the processor, causing the image processing device to perform:
   acquiring first image data representing a first image and second image data representing a second image, the first image including a first object image showing a part of a target object, the second image including a second object image showing another part of the target object, the first image including a first edge with respect to a first direction, the first object image including a first object-image edge with respect to the first direction, the first image including a plurality of first pixels located between the first edge and the first object-image edge, and the plurality of first pixels not being included in the first object image;
   selecting a first arrangement method when a specific condition is met, otherwise, selecting a second arrangement method when the specific condition is not met, the specific condition including a first condition indicating that the number of the plurality of the first pixels continuously arranged in the first direction is larger than a prescribed level;
   determining a relative position between the first image and the second image by using the selected one of the first arrangement method and the second arrangement method; and
   generating arranged image data representing an arranged image in which the first image and the second image are arranged according to the relative position so that the arranged image shows the target object.

2. The image processing device according to claim 1, wherein the selecting includes:
   identifying a pixel in the first image as the first pixel when a value of the pixel satisfies a determination condition;
   counting the number of the first pixels that satisfies a continuous condition, the continuous condition being such that prescribed number of first pixels are continuously arranged in a second direction orthogonal to the first direction; and
   determining whether the first condition is met by using the number of the first pixels satisfying the continuous condition.

3. The image processing device according to claim 2, wherein the first image includes a plurality of lines, each of the lines including a plurality of pixels arranged along the second direction;
   wherein the selecting further includes counting number of specific lines arranged in the first direction between the first edge and the first object-image edge from among the plurality of the lines, each of the specific lines including the first pixels satisfying the continuous condition, the number of the first pixels in the each of the specific line being greater than or equal to a threshold value; and
   wherein the determining of the first condition is made by using the number of the specific lines as the number of the first pixels satisfying the continuous condition.

4. The image processing device according to claim 3, wherein the plurality of the lines includes target lines between the first edge and the first object-image edge and includes a first end line neighboring the first edge and a second end line neighboring the first object-image edge,
   wherein the selecting further includes determining whether each of the target lines is one of the specific lines in a sequential order from the first end line to the second end line; and
   wherein the determining of the first condition is made by using the number of the specific lines continuously arranged in the first direction.

5. The image processing device according to claim 2, wherein the computer-readable instructions, when executed by the processor, causes the image processing device to further perform rotating the first object image so that the first edge is parallel to the first object-image edge.

6. The image processing device according to claim 1, wherein the second image including a second edge with respect to a third direction, the second object image including a second object-image edge with respect to the third direction, the second image including a plurality of second pixels, the plurality of the second pixels being included in the second object image and located between the second edge and the second object-image edge;
   wherein the specific condition further includes a second condition indicating that number of the plurality of the second pixels continuously arranged in the third direction is a relatively large;
   wherein the selecting of the first arrangement method is made when both the first condition and the second condition are met; and
   wherein the selecting of the second arrangement method is made when none of the first condition and the second condition is met.

7. The image processing device according to claim 6, wherein the first direction and the third direction are predetermined directions;
   wherein the selecting of the second arrangement method is made when one of the first condition and the second condition is met and the other of the first condition and the second condition is not met; and
   wherein the arranged image data is generated so that the first object-image edge and the second object-image edge are located in a center portion of the arranged image in a specific direction.

8. The image processing device according to claim 6, wherein the computer-readable instructions, when executed by the processor, causes the image processing device to further perform selecting a specific combination of a first specific edge as the first object-image edge and a second specific edge as the second object-image edge, the specific combination being selected from among combinations of each of edges in the first object-image and each of edges in the second object image;
   wherein determinations with respect to the first condition and the second condition are made for the specific combination so as to select one of the first arrangement method and the second arrangement method,
   wherein the selecting of the first arrangement method is made when both the first condition and the second condition are met for the specific combination;
   wherein the selecting of the second arrangement method is made when none of the first condition and the second condition is met for the specific combination;
   wherein none of the first arrangement method and the second arrangement method is selected when one of the first condition and the second condition is met and the other of the first condition and the second condition is not met for the specific combination;

wherein when one of the first arrangement method and the second arrangement method is selected for the specific combination, the arranged image data is generated so that the first specific edge and the second specific edge are located in a center portion of a specific direction; and wherein when none of the first arrangement method and the second arrangement method is selected for the specific combination, another specific combination is selected from among the combinations, and the determinations with respect to the first condition and the second condition are made for the another combination so as to select one of the first arrangement method and the second arrangement method.

9. The image processing device according to claim 6, wherein the first direction and the third direction is dynamically determined, wherein the computer-readable instructions, when executed by the processor, causes the image processing device to further perform selecting a specific combination of a first specific edge as the first object-image edge and a second specific edge as the second object-image edge, the specific combination being selected from among combinations of each of edges in the first object-image and each of edges in the second object image, wherein determinations with respect to the first condition and the second condition are made for the specific combination so as to select one of the first arrangement method and the second arrangement method; and wherein when the selecting of one of the first arrangement method and the second arrangement method is capable of selecting neither the first arrangement method nor the second arrangement method for the specific combination, another specific combination is selected from among the combinations, and the determinations with respect to the first condition and the second condition are made for the another combination so as to select one of the first arrangement method and the second arrangement method.

10. The image processing device according to claim 1, wherein the first object image is not overlapped with the second object image in the arranged image when the arranged image data is generated using the first arrangement method; and wherein a part of the first object image is overlapped with a part of the second object image in the arranged image when the arranged image data is generated using the second arrangement method.

11. The image processing device according to claim 10, wherein the second arrangement method includes:

determining a reference region that represents a part region of the first object image; and identifying a similar region similar to the reference region from among a search region that represents a part region of the second object image, wherein the determining of the relative position is made on a basis of the reference region and the similar region.

12. The image processing device according to claim 10, wherein the first arrangement method includes generating a plurality of pixels that is arranged outside the first object image and is along the first object-image edge by using pixels that are inside the first object image and are along the first object-image edge, wherein the determining of the relative position is made on a basis of the plurality of the pixels that is arranged outside the first object image.

13. The image processing device according to claim 1, wherein the plurality of the first pixels represent one specific color, the one specific color being one of white and black.

14. The image processing device according to claim 1, wherein the acquiring acquires the first image data by optically reading a first region of a sheet and acquires the second image data by optically reading a second region of the sheet; and wherein the first object image represents an image of the first region, wherein the plurality of first pixels constitutes a region that is included in the first image and is not included in an image representing the sheet.

15. A non-transitory computer readable storage medium storing a set of program instructions installed on and executed by a computer, the program instructions comprising:

acquiring first image data representing a first image and second image data representing a second image, the first image including a first object image showing a part of a target object, the second image including a second object image showing another part of the target object, the first image including a first edge with respect to a first direction, the first object image including a first object-image edge with respect to the first direction, the first image including a plurality of first pixels located between the first edge and the first object-image edge, and the plurality of first pixels not being included in the first object image;

selecting a first arrangement method when a specific condition is met, otherwise, selecting a second arrangement method when the specific condition is not met, the specific condition including a first condition indicating that the number of the plurality of the first pixels continuously arranged in the first direction is larger than a prescribed level;

determining a relative position between the first image and the second image by using the selected one of the first arrangement method and the second arrangement method; and generating arranged image data representing an arranged image in which the first image and the second image are arranged according to the relative position so that the arranged image shows the target object.

16. A method comprising:

acquiring first image data representing a first image and second image data representing a second image, the first image including a first object image showing a part of a target object, the second image including a second object image showing another part of the target object, the first image including a first edge with respect to a first direction, the first object image including a first object-image edge with respect to the first direction, the first image including a plurality of first pixels located between the first edge and the first object-image edge, and the plurality of first pixels not being included in the first object image;

selecting a first arrangement method when a specific condition is met, otherwise, selecting a second arrangement method when the specific condition is not met, the specific condition including a first condition indicating that the number of the plurality of the first pixels continuously arranged in the first direction is larger than a prescribed level;

determining a relative position between the first image and the second image by using the selected one of the first arrangement method and the second arrangement method; and generating arranged image data representing an arranged image in which the first image and the second image are arranged according to the relative position so that the arranged image shows the target object.

\* \* \* \* \*